US012793137B2

(12) United States Patent
Rooney

(10) Patent No.: US 12,793,137 B2
(45) **Date of Patent: *Nov. 10, 2026**

(54) CONTROLLING OPERATION OF A TRADING ALGORITHM BASED ON OPERATING CONDITION RULES

(71) Applicant: Trading Technologies International, Inc., Chicago, IL (US)

(72) Inventor: Patrick Joseph Rooney, St. Charles, IL (US)

(73) Assignee: Trading Technologies International, Inc., Chicago, IL (US)

( * ) Notice: Subject to any disclaimer, the term of this patent is extended or adjusted under 35 U.S.C. 154(b) by 253 days.

This patent is subject to a terminal disclaimer.

(21) Appl. No.: 18/808,601

(22) Filed: Aug. 19, 2024

(65) Prior Publication Data

US 2024/0412289 A1 Dec. 12, 2024

Related U.S. Application Data

(63) Continuation of application No. 18/101,106, filed on Jan. 24, 2023, now Pat. No. 12,106,369, which is a continuation of application No. 17/714,684, filed on Apr. 6, 2022, now Pat. No. 11,587,169, which is a continuation of application No. 16/930,466, filed on Jul. 16, 2020, now Pat. No. 11,334,943, which is a (Continued)

(51) Int. Cl.
*G06Q 40/04* (2012.01)

(52) U.S. Cl.
CPC .................................. *G06Q 40/045* (2025.08)

(58) Field of Classification Search
CPC .................................................... G06Q 40/045
USPC ........................................................... 705/37
See application file for complete search history.

(56) References Cited

U.S. PATENT DOCUMENTS

| | | | |
|---|---|---|---|
| 7,640,206 | B1 | 12/2009 | O'Connor et al. |
| 7,809,632 | B2 | 10/2010 | Chiulli et al. |
| 7,933,830 | B1 | 4/2011 | Buck |

(Continued)

OTHER PUBLICATIONS

Chapman, Peter. "The Algorithmic Aggregator", Traders Magazine, Nov. 2004, 3 pages, retrieved from http://rnvv.tradersmagazine.com/issues/20041130/2090-1.html on Jun. 22, 2012.

(Continued)

*Primary Examiner* — Bennett M Sigmond
*Assistant Examiner* — Michael J Warden
(74) *Attorney, Agent, or Firm* — McDonnell Boehnen Hulbert & Berghoff LLP

(57) ABSTRACT

Methods, systems and computer-readable storage media are provided for controlling operation of a trading algorithm based on operating condition rules. Certain embodiments provide a method including determining, using a computing device, an approval of use of a trading algorithm by monitoring for an occurrence of an operating condition defined in an operating condition rule. The example method includes determining if the trading algorithm complies with the operating condition rule during the occurrence of the operating condition. The example method includes sending, using the computing device, a notification to a trading instrument to approve or not approve the use of the trading algorithm. The trading algorithm is to be used to implement a trading strategy.

20 Claims, 14 Drawing Sheets

Related U.S. Application Data continuation of application No. 13/433,892, filed on Mar. 29, 2012, now Pat. No. 10,755,351.

(56) References Cited

U.S. PATENT DOCUMENTS

| | | | | |
|---|---|---|---|---|
| 8,065,222 | B2 | 11/2011 | O'Connor et al. | |
| 8,108,299 | B1 * | 1/2012 | Waelbroeck | G06Q 40/04 705/37 |
| 8,296,221 | B1 * | 10/2012 | Waelbroeck | G06Q 40/04 705/37 |
| 8,296,222 | B2 | 10/2012 | Chiulli et al. | |
| 8,442,885 | B1 | 5/2013 | Carrie et al. | |
| 9,727,913 | B2 | 8/2017 | Foygel et al. | |
| 10,068,292 | B2 * | 9/2018 | Sandow | G06Q 40/04 |
| 10,755,351 | B2 | 8/2020 | Rooney | |
| 11,443,250 | B1 * | 9/2022 | Peck-Walden | G06Q 40/04 |
| 2007/0038550 | A1 | 2/2007 | Caille et al. | |
| 2007/0083456 | A1 | 4/2007 | Akers | |
| 2007/0088648 | A1 | 4/2007 | Mather et al. | |
| 2008/0097884 | A1 | 4/2008 | Ferris | |
| 2008/0112557 | A1 | 5/2008 | Ricketts | |
| 2008/0114838 | A1 | 5/2008 | Taylor | |
| 2009/0076978 | A1 * | 3/2009 | Dayan | G06Q 40/04 705/36 R |
| 2009/0112775 | A1 | 4/2009 | Chiulli et al. | |
| 2009/0281954 | A1 | 11/2009 | Waelbroeck et al. | |
| 2011/0093378 | A1 | 4/2011 | Lane et al. | |
| 2011/0093379 | A1 | 4/2011 | Lane et al. | |
| 2012/0259759 | A1 | 10/2012 | Crist et al. | |
| 2013/0060887 | A1 | 3/2013 | Bradnick et al. | |
| 2013/0262283 | A1 * | 10/2013 | Rooney | G06Q 40/04 705/37 |
| 2014/0156490 | A1 | 6/2014 | Dietz et al. | |
| 2015/0142633 | A1 * | 5/2015 | Rooney | G06Q 40/04 705/37 |
| 2016/0110806 | A1 * | 4/2016 | Bent | G06Q 40/04 705/37 |
| 2016/0171610 | A1 | 6/2016 | Haag | |
| 2019/0095994 | A1 | 3/2019 | Rooney | |
| 2019/0392518 | A1 | 12/2019 | Bonig et al. | |
| 2020/0273109 | A1 | 8/2020 | Scianna et al. | |
| 2020/0349646 | A1 | 11/2020 | Rooney | |
| 2021/0049691 | A1 | 2/2021 | Howorka et al. | |
| 2022/0284513 | A1 | 9/2022 | Kapur et al. | |

OTHER PUBLICATIONS

International Search Report and Written Opinion for International Application No. PCT/US2013/033683, mailed Jun. 13, 2013.

* cited by examiner

CONTROLLING OPERATION OF A TRADING ALGORITHM BASED ON OPERATING CONDITION RULES

CROSS REFERENCE TO RELATED APPLICATIONS

This application is a continuation of U.S. patent application Ser. No. 18/101,106, filed Jan. 24, 2023, which is a continuation of U.S. patent application Ser. No. 17/714,684 filed Apr. 6, 2022, now U.S. Pat. No. 11,587,169, which is a continuation of U.S. patent application Ser. No. 16/930,466 filed Jul. 16, 2020, now U.S. Pat. No. 11,334,943, which is a continuation of U.S. patent application Ser. No. 13/433,892 filed Mar. 29, 2012, now U.S. Pat. No. 10,755,351, entitled "Controlling Operation of a Trading Algorithm Based on Operating Condition Rules," the contents of each of which are fully incorporated herein by reference for all purposes.

BACKGROUND

An electronic trading system generally includes a trading device in communication with an electronic exchange. The electronic exchange transmits information about a market (e.g., market data) to the trading device. Market data includes, for example, price data, market depth data, last traded quantity data, and/or any data related to a market for a tradeable object. In some electronic trading systems, the trading device sends messages, such as messages related to trade orders, to the electronic exchange. In another example, a server device, on behalf of the trading device, sends the messages (e.g., trade orders) to the electronic exchange. Upon receiving a trade order, the electronic exchange enters the trade order into an exchange order book and attempts to match a quantity of the trade order with a quantity of one or more contra-side trade orders.

Additionally, electronic trading systems may enable a user (for example, a trader) to design a trading algorithm. Trading algorithms generally specify that certain trading actions should be taken when certain market conditions occur and/or are detected. Trading actions include, for example, submitting, cancelling, or re-pricing a trade order.

BRIEF DESCRIPTION OF THE DRAWINGS

Certain embodiments are disclosed with reference to the following drawings.

Figure 1:
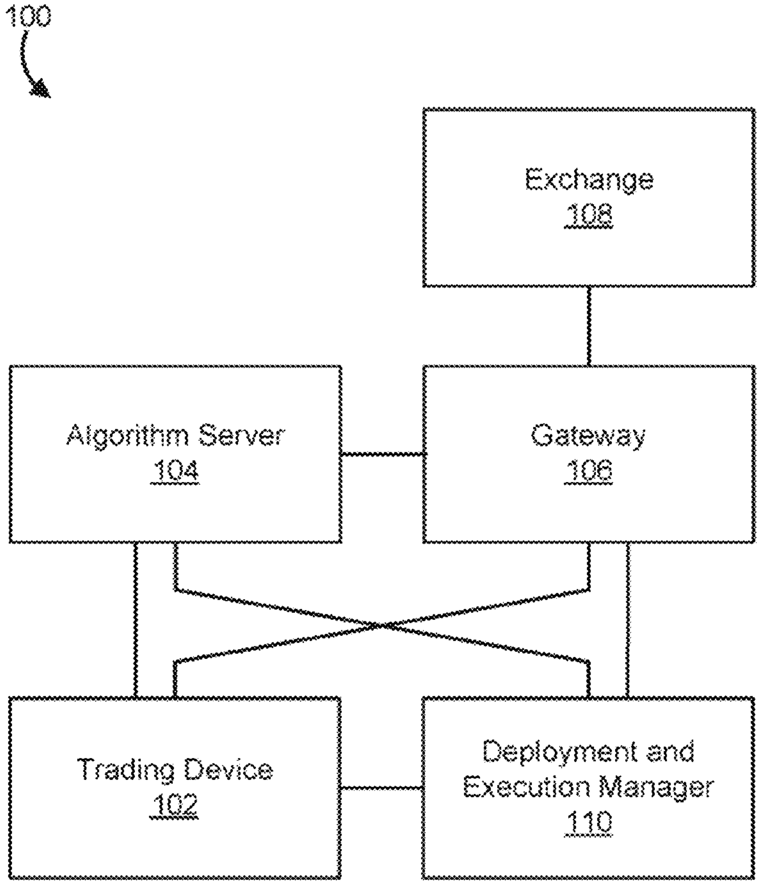
FIG. 1 illustrates a block diagram of an example electronic trading system in which certain embodiments may be employed.

Certain embodiments will be better understood when read in conjunction with the provided drawings, which illustrate examples. It should be understood, however, that the embodiments are not limited to the arrangements and instrumentality shown in the attached drawings.

DESCRIPTION

I. Brief Description of Certain Embodiments

Certain embodiments relate to systems and methods for automated control of a tradeable universe.

Electronic trading applications may enable a user (for example, a trader) to design a trading algorithm. Trading algorithms generally specify that certain trading actions should be taken when certain market conditions occur and/or are detected. Trading actions include, but are not limited to, submitting, cancelling, or re-pricing a trade order. Once designed, a trading algorithm may be automatically (e.g., with little or no human interaction) executed.

In addition to trading single items, a trading algorithm may trade more than one item according to a trading strategy. A trading strategy may define a relationship between two or more items to be traded. Each item in a trading strategy may be referred to as a leg of the trading strategy. Items in a trading strategy may also be referred to as tradeable objects. Once defined, items in the trading strategy may then be traded together according to the defined relationship. One common trading strategy is a spread. Trading according to a spread may also be referred to as spread trading. Trading algorithms utilizing spread trading may attempt to capitalize on changes or movements in the relationships between the items in the trading strategy, for example.

However, a user designing and/or facilitating use of a trading algorithm may not be aware of certain unfavorable conditions that may adversely affect orders entered into or orders to be entered into by the trading algorithm. For example, unfavorable market conditions may include poor market liquidity, high market volatility, high volatility of a correlated market, etc. Other unfavorable conditions may include, for example, high local central processing unit ("CPU") usage, high CPU usage on a server, high exchange matching engine turnaround time, high order routing turnaround time, high memory usage, etc. Additionally or alternatively, a user may not be aware of certain favorable conditions, such as good market liquidity, low market volatility, low volatility of a correlated market, etc.

Certain embodiments relate to controlling operation of a trading algorithm based on (e.g., by applying) operating condition rules. Operating condition rules may be specified by a definition which includes logic expressions and/or parameters that describe certain favorable and/or unfavorable conditions. Favorable and/or unfavorable conditions may be, for example, favorable or unfavorable deployment conditions, execution conditions, etc. Certain conditions may be checked against or otherwise compared to these operating condition rules before or while the trading algorithm is allowed to operate at a trading or trading-related instrument operating at a trading or trading-related instrument. A condition may include, for example, a current market condition, a state of a trading algorithm, a trader, a time of day, etc. A trading instrument may include, for example, a trading device, an algorithm server, or an exchange. For example, the trading algorithm may be checked against an operating condition rule before deployment of the trading algorithm to an algorithm server, at execution of the trading algorithm at the algorithm server, and/or while the trading algorithm is running and/or performing trading actions at the exchange.

Certain embodiments may allow a trading algorithm to operate, may prevent a trading algorithm from deploying to an algorithm server, may block execution of the trading algorithm at the algorithm server, and/or may limit execution of the trading algorithm at an exchange based on one or more operating condition rules, for example. For example, certain embodiments may prevent a trading algorithm from operating until an occurrence of a favorable market condition as defined in an operating condition rule. In another example, a trading algorithm may be prevented from operating during an occurrence of an unfavorable market condition as defined in an operating condition rule.

For example, certain embodiments may prevent all or a part of a trading algorithm utilizing spread trading from operating when the trading algorithm may submit orders into a highly liquid market on one leg and a highly illiquid market on another leg at the same time. For example, if the trading algorithm attempts to enter a trade for 100 contracts in one liquid Eurodollar Futures market (for example, GEZ11) as one leg of a trading strategy, this liquid market could accept the specified quantity of orders and the trades would be filled. However, if the trading algorithm attempts to hedge this risk with a position of 100 orders in another less liquid Eurodollar Futures market (for example, GEZ15) as another leg of the trading strategy, this hedging order may not be fully filled as the GEZ15 market in the example is not liquid enough to accept 100 orders. In this example, certain embodiments may prevent the trading algorithm from submitting any orders based on an operating condition rule specifying that orders are not to be entered into an illiquid market.

If, for example, the trading algorithm attempts to enter a lower quantity of tradeable objects, such as 10 tradeable objects in each leg, certain embodiments may allow the trading algorithm to begin submitting orders based on the operating condition rule(s). However, if either market becomes illiquid after orders are submitted, certain embodiments may prevent the trading algorithm from submitting new orders, unless the new orders are to be entered to offset already established positions.

Certain embodiments provide systems, methods, and apparatus for controlling operation of a trading algorithm based on operating condition rules.

Certain embodiments provide a method including determining, using a computing device, an approval of use of a trading algorithm by monitoring for an occurrence of an operating condition defined in an operating condition rule. The example method includes determining if the trading algorithm complies with the operating condition rule during the occurrence of the operating condition. The example method includes sending, using the computing device, a notification to a trading instrument to approve or not approve the use of the trading algorithm. The trading algorithm is to be used to implement a trading strategy.

Certain embodiments provide a system including a deployment and execution manager to determine an approval of use of a trading algorithm by monitoring for an occurrence of an operating condition defined in an operating condition rule. The example deployment and execution manager determines if the trading algorithm complies with the operating condition rule during the occurrence of the operating condition. The example deployment and execution manager sends a notification to a trading instrument to approve or not approve the use of the trading algorithm. The trading algorithm is to be used to implement a trading strategy.

Certain embodiments provide a tangible computer-readable storage medium including instructions that, when executed, cause a computing device to at least determine an approval of use of a trading algorithm by monitoring for an occurrence of an operating condition defined in an operating condition rule. The example tangible computer-readable storage medium includes instructions that, when executed, cause the computing device to determine if the trading algorithm complies with the operating condition rule during the occurrence of the operating condition. The example tangible computer-readable storage medium includes instructions that, when executed, cause the computing device to send a notification to a trading instrument to approve or not approve the use of the trading algorithm. The trading algorithm is to be used to implement a trading strategy.

Although the description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

II. Example Electronic Trading System

FIG. 1 illustrates a block diagram of an example electronic trading system 100 in which certain embodiments may be employed. The system 100 includes a trading device 102, an algorithm server 104, a gateway 106, an electronic exchange 108, and a deployment and execution manager 110. The trading device 102 is in communication with the algorithm server 104, the gateway 106, and the deployment and execution manager 110. The gateway 106 is in communication with the exchange 108. Additionally, the algorithm server is in communication with the gateway 106 and the deployment and execution manager 110. As used herein, the phrase "in communication with" may include in direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 102 may send orders to buy or sell tradeable objects at the exchange 108. For example, a user may utilize the trading device 102 to send the orders. The orders are sent through the algorithm server 104 and/or the gateway 106 to the exchange 108. In addition, market data is sent from the exchange 108 through the gateway 106 and/or the algorithm server 104 to the trading device 102. The user may also utilize the trading device 102 to monitor this market data and/or base a decision to send an order for a tradeable object on the market data.

A tradeable object is anything which may be traded with a quantity and/or a price. For example, financial products, including stocks, options, bonds, futures, currency, warrants, funds derivatives, securities, commodities, swaps, interest rate products, index based products, traded events, goods, and collections and/or combinations of these, may be tradeable objects. A tradeable object may be "real" or "synthetic." A real tradeable object includes products that are listed and/or administered by an exchange. A synthetic tradeable object includes products that are defined by the user. For example, a synthetic tradeable object may include a combination of real (or other synthetic) products such as a synthetic spread created by a user utilizing a trading device 102. There may be a real tradeable object that corresponds and/or is similar to a synthetic trading object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 102 may include one or more electronic computing platforms such as a hand-held device, laptop, desktop computer, workstation with a single or multi-core processor, server with multiple processors, and/or cluster of computers, for example. For example, while logically represented as a single device, trading device 102 may include a trading terminal in communication with a server, where collectively the trading terminal and the server are the trading device 102. The trading terminal may provide a trading screen to a user and may communicate commands to the server for further processing of the user's inputs through the trading screen, such as placing orders. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

The trading device 102 is generally owned, operated, controlled, programmed by, configured by, or otherwise used by a user. As used herein, the phrase "user" may include, but is not limited to, a human (for example, a trader) or an electronic trading device (for example, an algorithmic trading system). One or more users may be involved in the ownership, operation, control, programming, configuration, or other use, for example.

The trading device 102 may include one or more trading applications. As used herein, a trading application is an application that facilitates or improves electronic trading. A trading application provides one or more electronic trading tools. The trading application(s) may, for example, process market data by arranging and displaying the market data in trading and charting windows. The market data may be received from exchange 108, for example. As another example, the market data may be received from a simulation environment that provides historical data and/or simulates an exchange but does not effectuate real-world trades. This processing may be based on user preferences, for example. The trading application(s) may include an automated trading tool such as an automated spread trading tool, for example. The one or more trading applications may be distributed across one or more of the computing devices of the trading device 102. For example, certain components of a trading application may be executed on a trading workstation and other components of the trading application may be executed on a server in communication with the workstation.

The trading device 102 may include an electronic trading workstation, a portable trading device, an algorithmic trading system such as a "black box" or "grey box" system, an embedded trading system, and/or an automated trading tool, for example. For example, the trading device 102 may be a computing system running a copy of X_TRADER®, an electronic trading platform provided by Trading Technologies International, Inc. of Chicago, Illinois. As another example, the trading device 102 may be a computing device running an automated trading tool such as Autospreader® and/or Autotrader™, also provided by Trading Technologies International, Inc.

As another example, the trading device 102 may include a trading application which algorithmically processes market data and includes a user interface for manual placement of orders based on the algorithmic processing or to manipulate orders that were placed automatically. An algorithmic trading application is a trading application which includes an automatically processed algorithm to perform certain actions. That is, the trading application includes an automated series of instructions to perform defined action(s). The actions may include processing market data in a particular way, placing an order, modifying an existing order, deleting an order, refraining from placing an order, selecting which tradeable object(s) to act on, determining a price to place or modify an order at, determining a quantity to place an order at or modify an order to be, determining whether an order should be to buy or sell, and delaying action for a period of time, for example.

As used herein, a trading algorithm (also referred to as an algorithm) is specified by a definition which includes logic expressions and parameters that describe the trading algorithm to be used in trading. Logic expressions specify the relationship between parameters and may generate more parameters. Parameters may include, for example, inputs into the logic expressions of the trading algorithm. The definition of a trading algorithm may be, at least in part, specified by the algorithmic trading application. For example, an algorithmic trading application may allow a user to only specify parameters to be used by pre-defined logic expressions. As another example, an algorithmic trading application may allow a user to specify some or all of the logic expressions and some or all of the parameters. A trading algorithm where the logic expressions are specified by a user is a user-defined trading algorithm.

Trading applications may include computer readable instructions that are stored in a computer readable medium of the trading device 102 and executable by a processor. In certain embodiments, one or more components of a trading application may be stored on a trading workstation and other components of the trading application may be stored on a server in communication with the workstation. In certain embodiments, one or more components of a trading application may be loaded into the computer readable medium of the trading device 102 from another computer readable medium. For example, the trading application (or updates to the trading application) may be stored by a manufacturer, developer, or publisher on one or more compact discs ("CD"s), digital video discs ("DVD"s), Blu-Rays, flash drives, thumbdrives, and/or other portable storage devices which are then provided to someone responsible for loading the application onto the trading device 102 or to a server from which the trading device 102 retrieves the trading application. As another example, the trading device 102 may receive the trading application (or updates to the trading application) from a server, for example, via the Internet or an internal network. The trading device 102 may receive the trading application or updates when requested by the trading device 102 ("pull distribution") and/or un-requested by the trading device 102 ("push distribution").

The trading device 102 is adapted to send orders for a tradeable object. The orders may be sent in one or more messages or data packets or through a shared memory system, for example. The trading device 102 may also be adapted to cancel orders, change orders, and/or query an exchange, for example. As another example, the trading device 102 may be adapted to send orders to a simulated exchange in a simulation environment that does not effectuate real-world trades.

The orders sent by the trading device 102 may be sent at the request of a user or automatically, for example. For example, a trader may utilize an electronic trading workstation to place an order for a particular tradeable object, manually providing one or more parameters for the order, such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the trading device 102 includes a user interface. The user interface may include one or more display devices for presenting a text-based and/or graphical interface of a trading application to a user, for example. For example, the display devices may include computer monitors, hand-held device displays, projectors, and/or televisions. The user interface may be used to specify or review parameters for an order using a trading application. The user interface may include one or more input devices for receiving input, for example. For example, the input devices may include a keyboard, trackball, two or three-button mouse, and/or touch screen. The user interface may include other devices for interacting with a user. For example, information may be audibly provided to a user through a speaker and/or received through a microphone.

In certain embodiments, a trading application includes one or more trading screens to enable a user to interact with one or more markets. Trading screens may enable users to obtain and view market information, set order entry parameters, enter and cancel orders, and/or monitor positions while implementing various trading strategies, for example. For example, a trading application may receive information (such as bid prices, bid quantities, ask prices, ask quantities, prices and quantities for past sales, and/or other market related information) from the exchange 108, some or all of which, in turn, may be displayed with a user interface of trading device 102. Based on the received information, the trading screen may display a range of price levels and corresponding bid and ask quantities for the price levels in regard to tradeable objects. In order to provide the user with pertinent trading information, the trading screen may display a range of prices (and the corresponding bid and ask quantities) around the inside market. The information may be continuously or regularly provided to the trading application, which allows the trading application to update the trading screen with current market information. A user may use the trading screen to place buy and sell orders for tradeable objects or to otherwise trade the tradeable objects based on the displayed information, for example.

Trading screens may display one or more trading tools. Trading tools are electronic tools that allow, assist with, and/or facilitate electronic trading. Exemplary trading tools include, but are not be limited to, charts, trading ladders, order entry tools, automated trading tools, automated spreading tools, risk management tools, order parameter tools, order entry systems, market grids, fill windows, and market order windows, combinations thereof, other electronic tools used for trading, preparing to trade, managing trades, or analyzing the market.

In certain embodiments, the orders from the trading device 102 are sent to the exchange 108 through the algorithm server 104 and/or the gateway 106. The trading device 102 may communicate with the algorithm server 104 and/or the gateway 106 using a local area network, a wide area network, a wireless network, a virtual private network, a T-carrier T1 line, a T-carrier T3 line, an integrated services digital network ("ISDN") line, a point-of-presence, the Internet, and/or a shared memory system, for example.

In certain embodiments, the algorithm server 104, among other things, is configured to execute programming code corresponding to trading algorithms received from the trading device 102. The example algorithm server 104 is, but need not be, collocated with the exchange 108 (for example, placed at a physical location proximate or substantially proximate to the exchange 108).

The algorithm server 104 is configured to receive a trading algorithm, programming code corresponding to the trading algorithm, one or more identifiers corresponding to the programming code and/or trading algorithm, or any combination thereof. Such information may be stored to the algorithm server 104. For example, the algorithm server 104 may have one or more processors and one or more processor-readable media for storing such information.

In certain embodiments, the gateway 106 facilitates communication between the trading device 102 and/or the algorithm server 104 and the exchange 108. For example, the gateway 106 may receive orders from the trading device 102 and/or the algorithm server 104 and transmit the orders to the exchange 108. As another example, the gateway 106 may receive market data from the exchange 108 and transmit the market data to the algorithm server 104 and/or the trading device 102.

In certain embodiments, the gateway 106 performs processing on data communicated between the trading device 102 and/or the algorithm server 104 and the exchange 108. For example, the gateway 106 may process an order received from the trading device 102 and/or the algorithm server 104 into a data format understood by the exchange 108. Similarly, the gateway 106 may transform market data in an exchange-specific format received from the exchange 108 into a format understood by the algorithm server 104 and/or the trading device 102. The processing of the gateway 106 may also include tracking orders from the trading device 102 and/or the algorithm server 104 and updating the status of the order based on fill confirmations received from the exchange 108, for example. As another example, the gateway 106 may coalesce market data from the exchange 108 and provide it to the algorithm server 104 and/or the trading device 102.

In certain embodiments, the gateway 106 provides services other than processing data communicated between the trading device 102, the algorithm server 104, and/or the exchange 108. For example, the gateway 106 may provide risk processing.

The gateway 106 may include one or more electronic computing platforms such as a hand-held device, laptop, desktop computer, workstation with a single or multi-core processor, server with multiple processors, and/or cluster of computers, for example.

The gateway 106 may include one or more gateway applications. The gateway application(s) may, for example, handle order processing and market data processing. This processing may be based on user preferences, for example.

In certain embodiments, the gateway 106 communicates with the exchange 108 using a local area network, a wide area network, a virtual private network, a T1 line, a T3 line, an ISDN line, a point-of-presence, the Internet, and/or a shared memory system, for example.

In general, the exchange 108 may be owned, operated, controlled, and/or used by an exchange entity. Example exchange entities include the CME Group, the London International Financial Futures and Options Exchange ("LIFFE"), the IntercontinentalExchange ("ICE"), and NYSE Eurexnext. The exchange 108 may include an electronic matching system, such as a computer, server, or other computing device, that is adapted to allow tradeable objects, for example, offered for trading by the exchange, to be bought and sold. The electronic matching system may include a matching engine, for example. The exchange 108 may include separate entities, some which list and/or administer tradeable objects and others which receive and match orders, for example. The exchange 108 may include an electronic communication network ("ECN"), for example.

The exchange 108 is adapted to match orders to buy and sell tradeable objects. The tradeable objects may be listed for trading by the exchange 108. The orders may include orders received from the trading device 102, for example. Orders may be received from the trading device 102 through the algorithm server 104 and/or the gateway 106, for example. In addition, the orders may be received from other devices in communication with the exchange 108. That is, typically the exchange 108 is in communication with a variety of other trading devices (which may be similar to trading device 102) that also provide orders to be matched.

The exchange 108 is adapted to provide market data. The market data may be provided in one or more messages or data packets or through a shared memory system, for example. The market data may be provided to the trading device 102, for example. The market data may be provided to the trading device 102 through the gateway 106 and/or the algorithm server 104, for example. The market data may include data that represents an inside market, for example. The inside market is a lowest sell price (also referred to as a "best ask") and a highest buy price (also referred to as a "best bid") at a particular point in time (since the inside market may vary over time). The market data may also include market depth. Market depth refers to quantities available at the inside market and may also refer to quantities available at other prices away from the inside market. Thus, the inside market may be considered a first level of market depth. One tick away from the inside market may be considered a second level of market depth, for example. In certain embodiments, market depth is provided for all price levels. In certain embodiments, market depth is provided for less than all price levels. For example, market depth may be provided only for the first five price levels on both sides of the inside market. As another example, market depth may be provided for the first ten price levels at which quantity is available in the market. Due to the quantity available, there may be "gaps" in market depth. The market data may also include information such as the last traded price ("LTP"), the last traded quantity ("LTQ"), and/or order fill information.

In certain embodiments, the deployment and execution manager 110 communicates with the trading device 102, the algorithm server 104, and/or the gateway 106 to control the deployment and/or execution of trading algorithms using operating condition rules. Operating condition rules, such as deployment and/or execution rules, may be used to control the deployment and/or execution of trading algorithms during an existence of certain favorable and/or unfavorable conditions. Unfavorable conditions may include, for example, market conditions, processor conditions, system state conditions, etc. For example, unfavorable market conditions may include poor market liquidity, high market volatility, high volatility of a correlated market (correlated markets may be, for example, the E-Mini S&P ("ES") futures market and the Nasdaq E-Mini ("NQ") futures market), etc. Unfavorable processor and system state conditions may include, for example, high CPU usage on a device and/or server, high exchange matching engine turnaround times, high order routing turnaround times, high memory usage on a device, etc. Favorable conditions may include, for example, good market liquidity, low market volatility, low volatility of a correlated market, etc.

Controlling the deployment and/or execution of trading algorithms may be beneficial because it allows users to control the deployment and/or execution of trading algorithms. For example, controlling the deployment of trading algorithms may be beneficial because it allows users to check, change, or delete a trading algorithm early in the process of launching a trading algorithm. In certain embodiments, the deployment and execution manager's decision not to deploy or deploy a trading algorithm may be communicated to someone responsible for managing the trading algorithm (e.g., a trader, a risk manager, a supervisor, or a combination thereof). For example, when the deployment and execution manager prevents a trading algorithm from deploying, this may be an indication to a risk manager that the trading algorithm poses certain risks.

In certain embodiments, the deployment and execution manager 110 receives operating condition rules, such as deployment and/or execution rules, from the trading device 102. Deployment and/or execution rules may be used to control the deployment and/or execution of trading algorithms during an existence of certain favorable and/or unfavorable conditions. Unfavorable conditions may include, for example, market conditions, processor conditions, system state conditions, etc. Favorable conditions may include, for example, good market liquidity, low market volatility, low volatility of a correlated market, etc.

A user may create and/or input deployment and/or execution rules at the trading device 102 via a user interface, for example. In another example, a user may create and/or input deployment and/or execution rules at the deployment and execution manager 110 via a user interface, for example. The deployment and/or execution rules may be implemented by a user, for example, a trader, risk manager, etc., to control the deployment and/or execution of trading algorithms. In another example, the deployment and/or execution rules and/or the deployment and execution manager 110 may be implemented by the exchange 108 to control the execution of trading algorithms. For example, the exchange 108 may be configured to disable and/or block trading algorithms from entering large orders in thin markets. In another example, the deployment and/or execution rules may be implemented automatically by the trading device 102 or a risk manager device.

The deployment and execution manager 110 uses the operating condition rules to check and/or monitor for an occurrence of a favorable and/or unfavorable market condition defined by the operating condition rules. Operating condition rules, such as deployment and/or execution rules, may be specified by a definition which includes logic expressions and/or parameters that describe certain favorable and/or unfavorable conditions. The deployment and execution manager 110 applies the deployment and/or execution rules to a trading algorithm to determine if the trading algorithm should be allowed to deploy, allowed to execute, and/or allowed to continue running during the occurrence of the favorable and/or unfavorable condition. The deployment and execution manager 110 may control the deployment and/or execution of all trading algorithms, or select trading algorithms. For example, the deployment and execution manager 110 may control only those trading algorithms used by new traders. In such examples, operating condition rules may be experience- and/or role-based. For example, an operating condition rule may prevent a new trader from deploying a trading algorithm during an unfavorable market condition. The deployment and/or execution manager 110 may control, for example, only new trading algorithms. For example, an operating condition rule may prevent a trade algorithm from deploying if it has not been previously executed by a user.

In certain embodiments, the deployment and execution manager 110 receives a deployment request from the trading device 102 to deploy a trading algorithm to the algorithm server 104. The deployment and execution manager 110 checks for a favorable and/or unfavorable deployment condition as defined by the received deployment rule. Based on the deployment condition as applied to the trading algorithm, the deployment and execution manager 110 approves or denies the deployment request. For example, if an unfavorable deployment condition has not occurred, the deployment request may be approved. Where there is an occurrence of the unfavorable deployment condition, if any order that may be entered by the trading algorithm is undesirable, the deployment request may be denied. Where the deployment request is approved, the trading algorithm is allowed to deploy to the algorithm server 104. Where the deployment request is denied, the trading algorithm is blocked and/or prevented from deploying to the algorithm server 104. To block and/or prevent the trading algorithm from deploying, the deployment and execution manager 110 may send a notification to the trading device 102. The notification may include, for example, setting a flag to disable deployment of the trading algorithm at the trading device 102. Additionally, the trading device 102 may display whether the trading algorithm was allowed to or prevented from deploying and/or why the trading algorithm was allowed to or prevented from deploying.

In certain embodiments, the deployment and execution manager 110 monitors for a deployment condition, as defined by the deployment rule, without receiving a deployment request and/or prior to receiving a deployment request. For example, the deployment and execution manager 110 may continuously, periodically, or aperiodically check for the deployment condition without receiving a deployment request and/or prior to receiving a deployment request. Based on the deployment condition as applied to the trading algorithm, the deployment and execution manager 110 allows the trading algorithm to deploy to the algorithm server 104 or blocks the deployment to the algorithm server 104. Monitoring for an occurrence of a favorable and/or unfavorable deployment condition without receiving a deployment request and/or prior to receiving a deployment request enables the deployment and execution manager 110 to more quickly allow and/or disable access to the trading algorithm.

In certain embodiments, the deployment and execution manager 110 receives an execution request from the algorithm server 104 to execute a trading algorithm. Executing a trading algorithm includes, for example, monitoring market conditions and sending orders to the exchange 108 when certain market conditions are satisfied. The deployment and execution manager 110 checks for a favorable and/or unfavorable execution condition as defined by the received execution rule. Based on the execution condition as applied to the trading algorithm, the deployment and execution manager 110 approves or denies the execution request. For example, if there is not an occurrence of an unfavorable execution condition, the execution request may be approved. Where there is an occurrence of the unfavorable execution condition, if any order that may be entered by the trading algorithm is undesirable, the execution request may be denied. Where the execution request is approved, the trading algorithm is allowed to execute at the algorithm server 104. Where the execution request is denied, the trading algorithm may be blocked and/or prevented from executing at the algorithm server 104. To block and/or prevent the trading algorithm from executing, the deployment and execution manager 110 may send a notification to the algorithm server 104. The notification may include, for example, setting a flag to disable execution of the trading algorithm at the algorithm server 104. Additionally, the trading device 102 may display whether the trading algorithm was allowed to or prevented from executing and/or why the trading algorithm was allowed to or prevented from executing.

In certain embodiments, the deployment and execution manager 110 monitors for an execution condition as defined by the execution rule without receiving an execution request and/or prior to receiving an execution request. For example, the deployment and execution manager 110 may continuously, periodically, or aperiodically check for the execution condition without receiving an execution request and/or prior to receiving an execution request. Based on the execution condition as applied to the trading algorithm, the deployment and execution manager 110 allows the trading algorithm to execute at the algorithm server 104 as normal or blocks the execution at the algorithm server 104. Monitoring for an occurrence of a favorable and/or unfavorable execution condition without receiving an execution request and/or prior to receiving an execution request enables the deployment and execution manager 110 to more quickly allow and/or disable access to the trading algorithm.

In certain embodiments, the deployment and execution manager 110 receives a request from the algorithm server 104 to continue running a trading algorithm. The request to continue running is received while the trading algorithm is, for example, executing trades and/or sending orders at the exchange 108. The deployment and execution manager 110 checks for a favorable and/or unfavorable execution condition as defined by the received execution rule. Based on the execution condition as applied to the trading algorithm, the deployment and execution manager 110 approves or denies the request to continue running the trading algorithm. For example, if there is not an occurrence of an unfavorable execution condition, the request to continue running the trading algorithm may be approved. Where the request to continue running is approved, the trading algorithm is allowed to continue running and executing trades. Where there is an occurrence of the unfavorable execution condition, if any order that may be entered by the trading algorithm is undesirable, the trading algorithm may be blocked and/or limited in its execution. For example, the trading algorithm may be blocked from adding to a position or entering a new position during the unfavorable condition, but may be allowed to close a position or offset and/or hedge an existing position.

In certain embodiments, the deployment and execution manager 110 monitors for an execution condition as defined by the execution rule without receiving a request to continue running and/or prior to receiving a request to continue running the trading algorithm. For example, the deployment and execution manager 110 may continuously, periodically, or aperiodically check for the execution condition without receiving a request to continue running and/or prior to receiving a request to continue running the trading algorithm. Based on the execution condition as applied to the trading algorithm, the deployment and execution manager 110 allows the trading algorithm to continue running or limits the execution of the trading algorithm. Monitoring for an occurrence of a favorable and/or unfavorable execution condition without receiving a request to continue running and/or prior to receiving a request to continue running the trading algorithm enables the deployment and execution manager 110 to more quickly allow and/or disable access to the trading algorithm.

In certain embodiments, the system 100 includes more than one trading device 102. For example, multiple trading devices similar to the trading device 102, discussed above, may be in communication with the algorithm server 104 and/or the gateway 106 to send orders to the exchange 108.

In certain embodiments, the system 100 includes more than one gateway 106. For example, multiple gateways similar to the gateway 106, discussed above, may be in communication with the trading device 102, the algorithm server 104, and/or the exchange 108. Such an arrangement may be used to provide redundancy should one gateway 106 fail, for example.

In certain embodiments, the system 100 includes more than one exchange 108. For example, the gateway 106 may be in communication with multiple exchanges similar to the exchange 108, discussed above. Such an arrangement may allow the trading device 102 to trade at more than one exchange through the gateway 106, for example.

In certain embodiments, the system 100 includes more than one exchange 108 and more than one gateway 106. For example, multiple gateways similar to the gateway 106, discussed above, may be in communication with multiple exchanges similar to the exchange 108, discussed above. Each gateway may be in communication with one or more different exchanges, for example. Such an arrangement may allow one or more trading devices 110 to trade at more than one exchange (and/or provide redundant connections to multiple exchanges), for example.

In certain embodiments, the trading device 102 includes one or more computing devices or processing components. In other words, the functionality of the trading device 102 may be performed by more than one computing device. For example, one computing device may generate orders to be sent to the exchange 108 while another computing device may provide a graphical user interface to a user. In certain embodiments, the gateway 106 includes one or more computing devices or processing components. In other words, the functionality of the gateway 106 may be performed by more than one computing device. In certain embodiments, the exchange 108 includes one or more computing devices or processing components. In other words, the functionality of the exchange 108 may be performed by more than one computing device. In certain embodiments, the functionality of the deployment and execution manager 110 may be performed by more than one computing device.

In certain embodiments, the algorithm server 104 is part of the trading device 102. For example, the components of the algorithm server 104 may be part of the same computing platform as the trading device 102. As another example, the functionality of the algorithm server 104 may be performed by components of the trading device 102.

In certain embodiments, the gateway 106 is part of the trading device 102. For example, the components of the gateway 106 may be part of the same computing platform as the trading device 102. As another example, the functionality of the gateway 106 may be performed by components of the trading device 102. In certain embodiments, the gateway 106 is not present. Such an arrangement may occur when the trading device 102 does not need to utilize the gateway 106 to communicate with the exchange 108, for example. For example, if the trading device 102 has been adapted to communicate directly with the exchange 108.

In certain embodiments, the deployment and execution manager 110 is part of the trading device 102. For example, the components of the deployment and execution manager 110 may be part of the same computing platform as the trading device 102. As another example, the functionality of the deployment and execution manager 110 may be performed by components of the trading device 102. In certain embodiments, the deployment and execution manager 110 is part of the algorithm server 104 and/or the gateway 106.

In certain embodiments, the algorithm server 104 is located at the same site as the trading device 102. In certain embodiments, the algorithm server 104 is physically located at or near the exchange 108. This may be referred to as co-location. Co-location is used to provide the lowest latency to the exchange 108 by placing the algorithm server 104 as close to the exchange 108 as possible. In certain embodiments, the algorithm server 104 is physically located at a site separate from both the trading device 102 and the gateway 106. In certain embodiments, the gateway 106 is physically located at the same site as the trading device 102. In certain embodiments, the gateway 106 is physically located at the same site as the exchange 108. In certain embodiments, the trading device 102 is physically located at the same site as the exchange 108. In certain embodiments, the gateway 106 is physically located at a site separate from both the trading device 102 and the exchange 108. In certain embodiments, the deployment and execution manager 110 is located at the same site as the trading device 102. In certain embodiments, the deployment and execution manager 110 is physically located at the same site as the gateway 106. In certain embodiments, the deployment and execution manager 110 is physically located at a site separate from both the trading device 102 and the gateway 106.

In certain embodiments, the system 100 may include other devices that are specific to the communications architecture such as middleware, firewalls, hubs, switches, routers, exchange-specific communication equipment, modems, security managers, and/or encryption/decryption devices.

III. Example Computing Device

Figure 2:
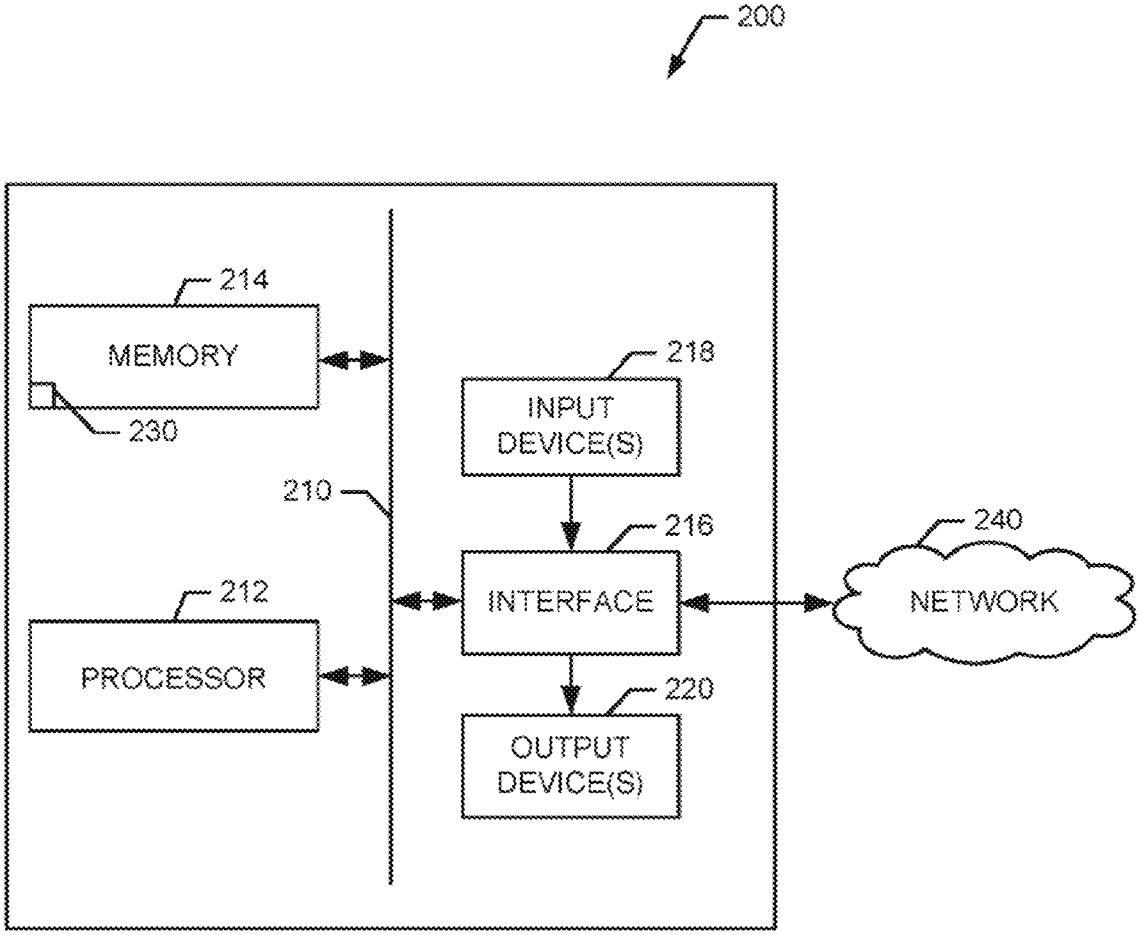
FIG. 2 illustrates a block diagram of an example computing device that may be used to implement certain embodiments.

FIG. 2 illustrates a block diagram of an example computing device 200 which may be used to implement the disclosed embodiments. The trading device 102 of FIG. 1 may include one or more computing devices 200, for example. The gateway 106 of FIG. 1 may include one or more computing devices 200, for example. The exchange 108 of FIG. 1 may include one or more computing devices 200, for example. The computing device 200 may include additional, different, or fewer components.

The computing device 200 includes a communication network 210, a processor 212, a memory 214, an interface 216, an input device 218, and an output device 220. The computing device 200 may include additional, different, or fewer components. For example, multiple communication networks, multiple processors, multiple memory, multiple interfaces, multiple input devices, multiple output devices, or any combination thereof, may be provided. As another example, the computing device 200 may not include an input device 218 or output device 220.

As shown in FIG. 2, the computing device 200 may include a processor 212 coupled to a communication network 210. The communication network 210 may include a communication bus, channel, network, circuit, switch, fabric, or other mechanism for communicating data between components in the computing device 200. The communication network 210 may be communicatively coupled with and transfer data between any of the components of the computing device 200.

The processor 212 may be any suitable processor, processing unit, or microprocessor. The processor 212 may include one or more general processors, digital signal processors, application specific integrated circuits, field programmable gate arrays, analog circuits, digital circuits, programmed processors, and/or combinations thereof, for example. The processor 212 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 200 is a multi-processor system and, thus, may include one or more additional processors which are communicatively coupled to the communication network 210.

The processor 212 may be operable to execute logic and other computer readable instructions encoded in one or more tangible media, such as the memory 214. As used herein, logic encoded in one or more tangible media includes instructions which may be executable by the processor 212 or a different processor. The logic may be stored as part of software, hardware, integrated circuits, firmware, and/or micro-code, for example. The logic may be received from an external communication device via a communication network such as the network 240. The processor 212 may execute the logic to perform the functions, acts, or tasks illustrated in the figures or described herein.

The memory 214 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 214 may include any desired type of mass storage device including hard disk drives, optical media, magnetic tape or disk, etc.

The memory 214 may include one or more memory devices. For example, the memory 214 may include local memory, a mass storage device, volatile memory, non-volatile memory, or a combination thereof. The memory 214 may be adjacent to, part of, programmed with, networked with, and/or remote from processor 212, so the data stored in the memory 214 may be retrieved and processed by the processor 212, for example. The memory 214 may store instructions which are executable by the processor 212. The instructions may be executed to perform one or more of the acts or functions described herein or shown in the figures.

The memory 214 may store a trading application 230. In certain embodiments, the trading application 230 may be accessed from or stored in different locations. The processor 212 may access the trading application 230 stored in the memory 214 and execute computer-readable instructions included in the trading application 230.

In certain embodiments, during an installation process, the trading application may be transferred from the input device 218 and/or the network 240 to the memory 214. When the computing device 200 is running or preparing to run the trading application 230, the processor 212 may retrieve the instructions from the memory 214 via the communication network 210.

IV. Controlling Trading Algorithm Deployment and/or Execution

In certain embodiments, the deployment and execution manager 110 of FIG. 1 is used to control the deployment and/or execution of trading algorithms. In certain embodiments, operating condition rules, such as deployment and/or execution rules, may be created and/or input by a user to define favorable and/or unfavorable market conditions. Operating conditions may include algorithm deployment conditions, trade execution conditions, etc., resulting in deployment rules, execution rules, etc. Deployment and/or execution rules may be specified by a definition which includes logic expressions and/or parameters that describe certain favorable and/or unfavorable conditions. In certain embodiments, the deployment and execution manager 110 of FIG. 1 checks and/or monitors for an occurrence of the favorable and/or unfavorable condition defined by the deployment and/or execution rules. The deployment and execution manager 110 applies the deployment and/or execution rules to a trading algorithm to determine if the trading algorithm is allowed to deploy, execute, and/or to continue running during the occurrence of the favorable and/or unfavorable condition.

Figure 3A:
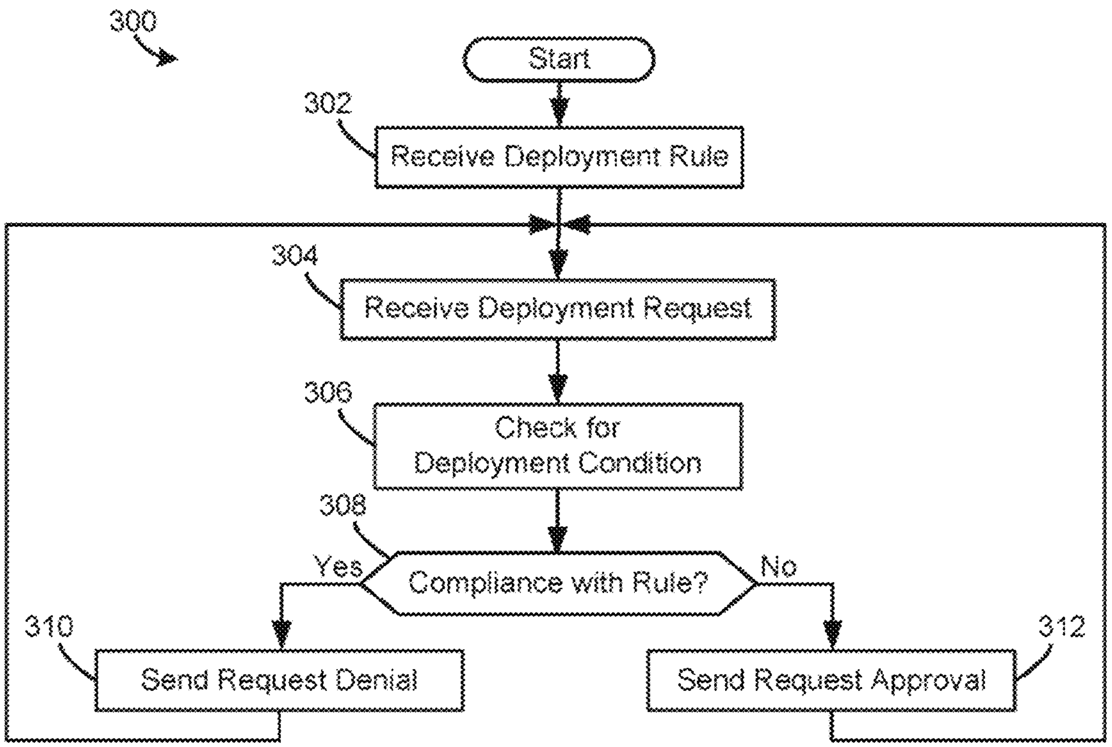
FIGS. 3A and 3B illustrate flow diagrams of example methods for controlling a deployment of a trading algorithm.

FIG. 3A illustrates a flow diagram of an example method 300 for controlling a deployment of a trading algorithm to an algorithm server, for example, the algorithm server 104 of FIG. 1. At block 302, a deployment rule is received by, for example, a deployment manager, such as the deployment and execution manager 110 of FIG. 1. The deployment rule may be created and/or entered by a user at, for example, a trading device, such as the trading device 102 of FIG. 1. The deployment rule is used to define a favorable and/or unfavorable deployment condition in which a user or another person managing a trading algorithm may wish for a trading algorithm to be allowed to deploy and/or prevented from deploying. For example, the deployment rule may define a time at which a trading algorithm is to be blocked from establishing a position in a market, such as a time close to when the market will close. Multiple deployment rules defining multiple favorable and/or unfavorable conditions may be received by the deployment and execution manager 110, for example.

At block 304, a deployment request is received from, for example, a trading application running on the trading device 102. The deployment request may be, for example, a request to deploy a certain trading algorithm to the algorithm server 104. The deployment request may include, for example, the trading algorithm, an identifier of the trading algorithm, and code representing the trading algorithm.

At block 306, the deployment manager 110 checks for the deployment condition (e.g., a favorable or unfavorable condition) defined in the deployment rule. In the example of FIG. 3A, the deployment manager 110 checks for the deployment condition once a deployment request has been received. The deployment manager 110 checks for the deployment condition by gathering data, for example, the market data sent by the exchange 108, processor data, and/or system data, and applying the data to the deployment rule. If there is no occurrence of the deployment condition, the deployment manager 110 approves the deployment request.

Once the deployment manager 110 detects an occurrence of the deployment condition defined in the deployment rule, at block 308, the deployment manager 110 determines if the trading algorithm complies with the rule. If, for example, any order that may be entered into by the trading algorithm is nondesirable, the deployment manager 110 determines that the trading algorithm does not comply with the rule during the unfavorable condition. For example, the deployment manager 110 determines if the deployment of the trading algorithm would result in the entering of an order during a time which is prohibited by the deployment rule.

If deployment of the trading algorithm does not comply with the deployment rule, at block 310, the deployment manager 110 sends a deployment request denial to, for example, the trading application running on the trading device 102. The denial of the deployment request may result in a flag being set that prevents and/or blocks the trading algorithm from being deployed to the algorithm server 104.

If the deployment of the trading algorithm conforms (e.g., satisfies, complies, etc.) with the deployment rule, at block 312, the deployment manager 110 sends a deployment request approval to, for example, the trading application running on the trading device 102. The approval of the deployment request allows the trading algorithm to be deployed from the trading device 102 to the algorithm server 104.

Figure 3B:
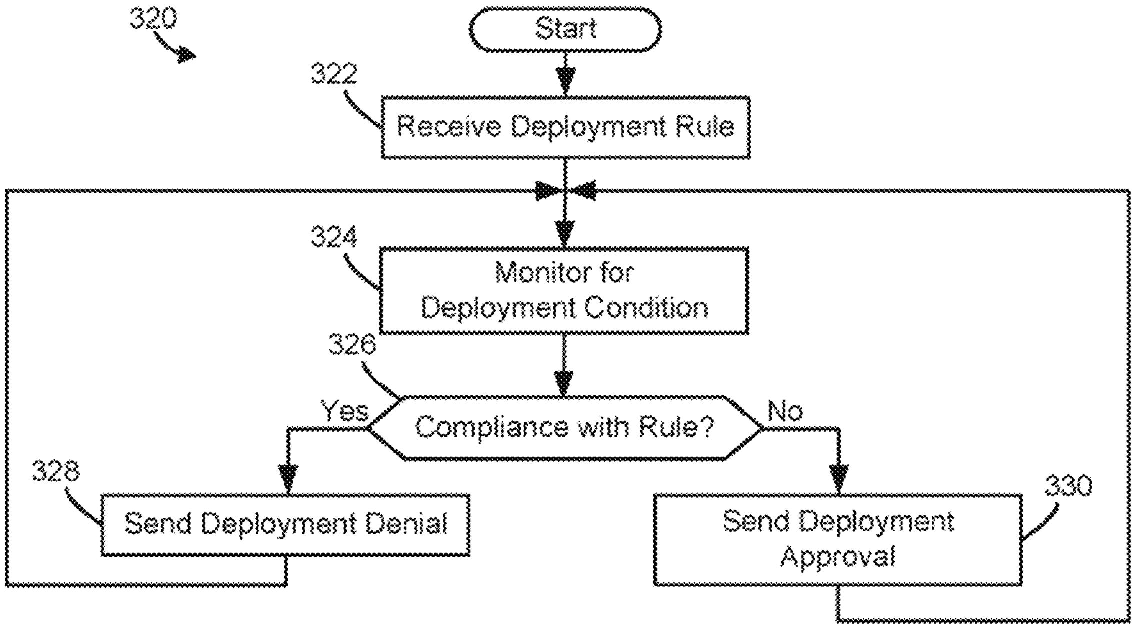

FIG. 3B illustrates a flow diagram of another example method 320 for controlling a deployment of a trading algorithm to the algorithm server 104. At block 322, a deployment rule is received by, for example, the deployment and execution manager 110. The deployment rule may be created and/or entered by a user at, for example, the trading device 102. The deployment rule is used to define a favorable and/or unfavorable deployment condition in which a user may wish for a trading algorithm to be allowed to deploy and/or prevented from deploying.

At block 324, the deployment manager 110 monitors for the deployment condition defined in the deployment rule. The deployment manager 110 monitors for the deployment condition by gathering data, for example, the market data sent by the exchange 108, processor data, and/or system data, and applying the data to the deployment rule. In the example of FIG. 3B, the deployment manager 110 may continuously, periodically, or aperiodically gather data to monitor for the deployment condition.

Once the deployment manager 110 detects an occurrence of the deployment condition defined in the deployment rule, at block 326, the deployment manager 110 determines if the trading algorithm complies with the rule. If, for example, any order that may be entered into by the trading algorithm is nondesirable, the deployment manager 110 determines that the trading algorithm does not comply with the rule during the occurrence of the unfavorable condition.

If deployment of the trading algorithm does not comply with the deployment rule, at block 328, the deployment manager 110 denies deployment of the trading algorithm. The denial may result in a flag being set that prevents and/or blocks the trading algorithm from being deployed to the algorithm server 104.

If the deployment of the trading algorithm complies with the deployment rule, at block 330, the deployment manager 110 sends a deployment approval to the trading application running on the trading device 102 to allow the trading algorithm to be deployed from the trading device 102 to the algorithm server 104.

Figure 4A:
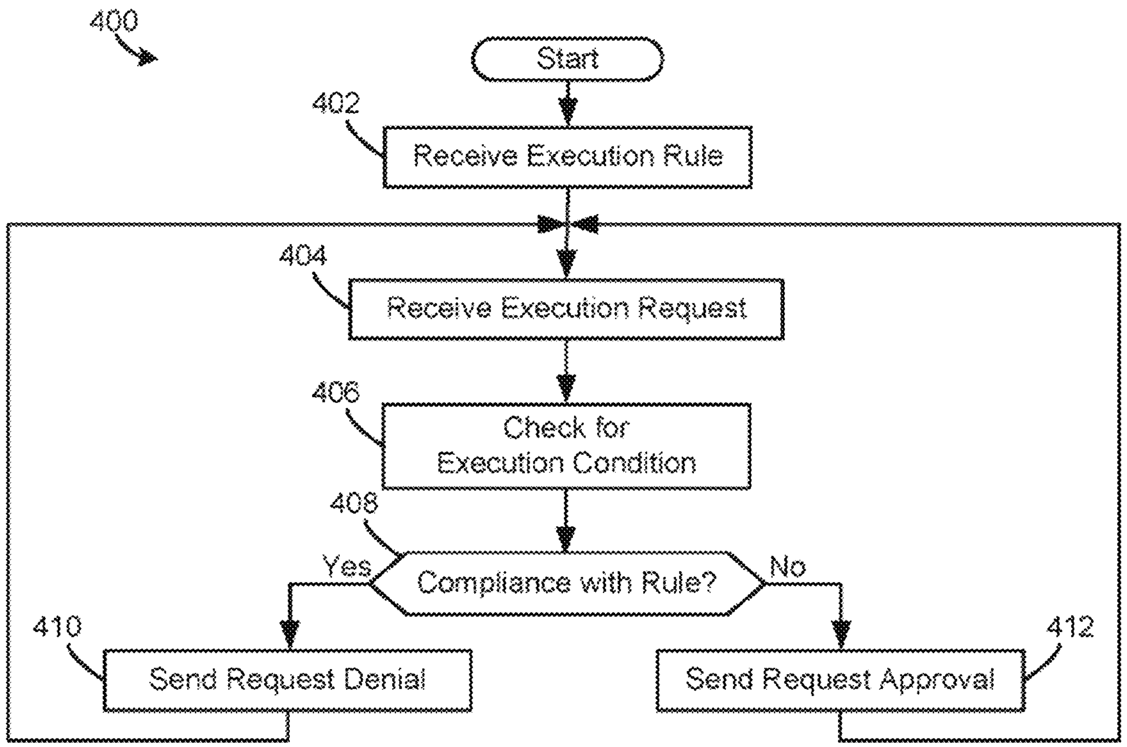
FIGS. 4A and 4B illustrate flow diagrams of example methods for controlling an execution of a trading algorithm.

FIG. 4A illustrates a flow diagram of an example method 400 for controlling an execution of a trading algorithm at an algorithm server, for example, the algorithm server 104 of FIG. 1. At block 402, an execution rule is received by, for example, an execution manager, such as the deployment and execution manager 110 of FIG. 1. The execution rule may be created and/or entered by a user at, for example, a trading device, such as the trading device 102 of FIG. 1. The execution rule is used to define a favorable and/or unfavorable execution condition in which a user may wish for a trading algorithm to be allowed to execute and/or prevented from executing. For example, the execution rule may define a time at which a trading algorithm is to be blocked from establishing a position in a market. Multiple execution rules defining multiple favorable and/or unfavorable execution conditions may be received by the execution manager 110, for example.

At block 404, an execution request is received from, for example, the algorithm server 104. The execution request may be, for example, a request to execute a certain trading algorithm at the algorithm server 104, to begin executing trades at an exchange, such as the exchange 108 of FIG. 1.

At block 406, the execution manager 110 checks for the execution condition defined in the execution rule. In the example of FIG. 4A, the execution manager 110 checks for the execution condition once an execution request has been received. The execution manager 110 checks for the execution condition by gathering data, for example, the market data sent by the exchange 108, processor data, and/or system data, and applying the data to the execution rule. If there is no occurrence of the execution condition, the execution manager 110 approves the execution request.

Once the execution manager 110 detects an occurrence of the execution condition defined in the execution rule, at block 408, the execution manager 110 determines if the trading algorithm complies with the rule. If, for example, any order that may be entered into by the trading algorithm is nondesirable, the execution manager 110 determines that the trading algorithm does not comply with the rule during the occurrence of the unfavorable condition. For example, the execution manager 110 determines if the execution of the trading algorithm would result in the entering of an order during a time which is prohibited by the execution rule.

If execution of the trading algorithm does not comply with the execution rule, at block 410, the execution manager 110 sends an execution request denial to the algorithm server 104. The denial of the execution request may result in a flag being set that prevents and/or blocks the trading algorithm from being executed at the algorithm server 104.

If the execution of the trading algorithm complies with the execution rule, at block 412, the execution manager 110 sends an execution request approval to the algorithm server 104. The approval of the execution request allows the trading algorithm to be executed at the algorithm server 104.

Figure 4B:
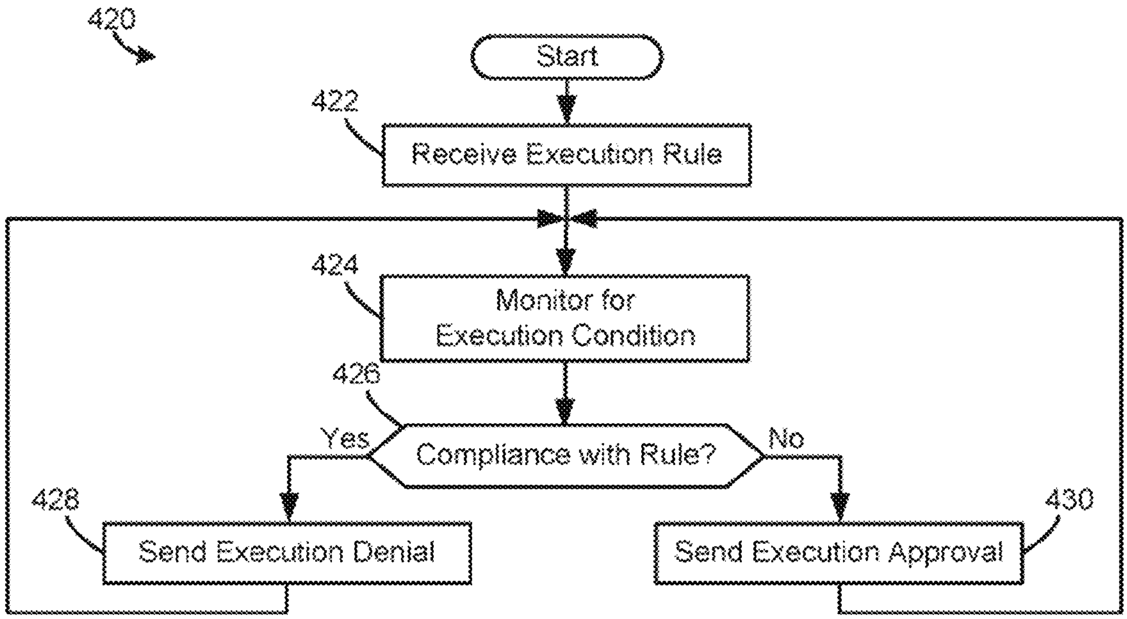

FIG. 4B illustrates a flow diagram of another example method 420 for controlling an execution of a trading algorithm at the algorithm server 104. At block 422, an execution rule is received by, for example, an execution manager, such as the deployment and execution manager 110 of FIG. 1. The execution rule may be created and/or entered by a user at, for example, a trading device, such as the trading device 102 of FIG. 1. The execution rule is used to define a favorable and/or unfavorable execution condition in which a user may wish for a trading algorithm to be allowed to execute and/or prevented from executing.

At block 424, the execution manager 110 monitors for the execution condition defined in the execution rule. The execution manager 110 monitors for the execution condition by gathering data, for example, the market data sent by the exchange 108, processor data, and/or system data, and applying the data to the execution rule. In the example of FIG. 4B, the execution manager 110 may continuously, periodically, or aperiodically collect data to monitor for the execution condition.

Once the execution manager 110 detects an occurrence of the execution condition defined in the execution rule, at block 426, the execution manager 110 determines if the trading algorithm complies with the rule. If, for example, any order that may be entered into by the trading algorithm is nondesirable, the execution manager 110 determines that the trading algorithm does not comply with the rule during the occurrence of the unfavorable condition.

If execution of the trading algorithm does not comply with the execution rule, at block 428, the execution manager 110 denies execution of the trading algorithm. The denial may result in a flag being set that prevents and/or blocks the trading algorithm from being executed at the algorithm server 104.

If the execution of the trading algorithm complies with the execution rule, at block 430, the execution manager 110 sends an execution approval to the algorithm server 104 to allow the trading algorithm to be executed at the algorithm server 104.

Figure 5A:
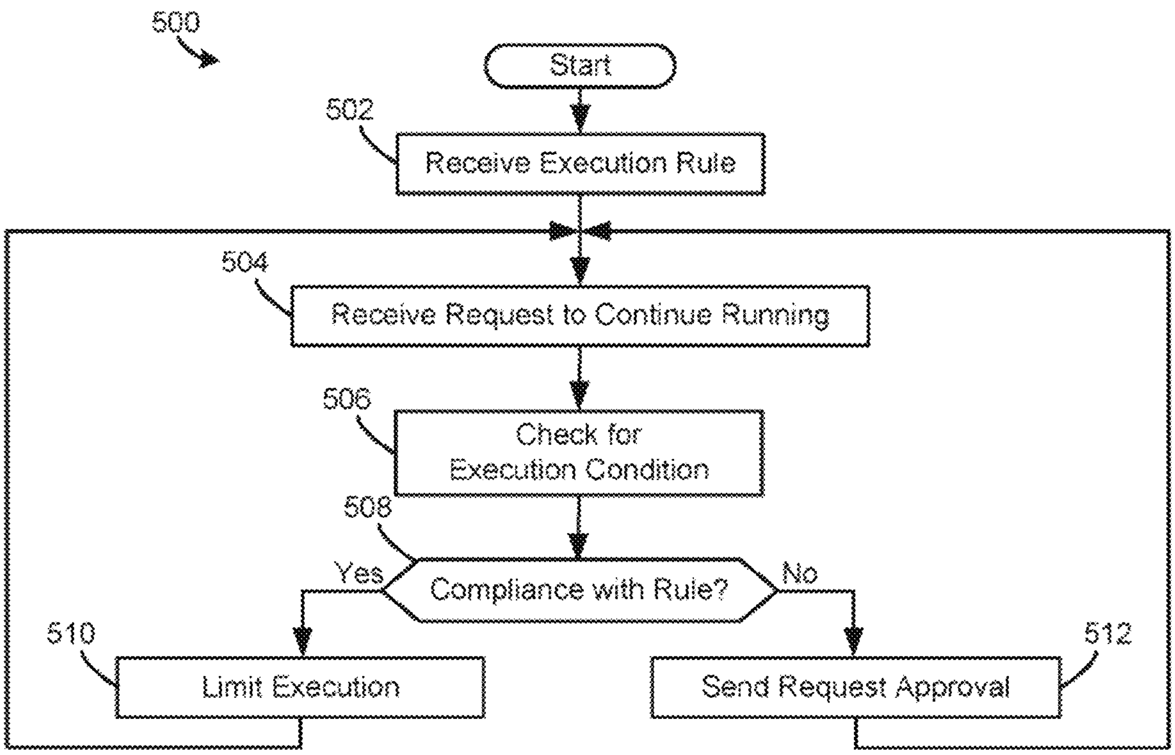
FIGS. 5A and 5B illustrate flow diagrams of example methods for controlling a running of a trading algorithm.

FIG. 5A illustrates a flow diagram of an example method 500 for controlling a continued running of a trading algorithm at an algorithm server (e.g., the algorithm server 104) that is executing orders at an exchange (e.g., the exchange 108). At block 502, an execution rule is received by, for example, an execution manager, such as the deployment and execution manager 110 of FIG. 1. The execution rule may be created and/or entered by a user at, for example, a trading device, such as the trading device 102 of FIG. 1. The execution rule is used to define a favorable and/or unfavorable market execution condition in which a user may wish for a trading algorithm to be allowed to execute, blocked from executing, and/or limited in its execution. For example, the execution rule may define at time at which a trading algorithm is to be blocked from increasing a position in a market. Multiple execution rules defining multiple favorable and/or unfavorable execution conditions may be received by the execution manager 110, for example.

At block 504, a request to continue running a trading algorithm is received from the algorithm server 104. The request to continue running a trading algorithm may be, for example, a request to continue running a certain trading algorithm at the algorithm server 104, that is executing trades at the exchange 108.

At block 506, the execution manager 110 checks for the execution condition defined in the execution rule. In the example of FIG. 5A, the execution manager 110 checks for the execution condition once a request to continue running the trading algorithm has been received. The execution manager 110 checks for the execution condition by gathering data, for example, the market data sent by the exchange 108, processor data, and/or system data, and applying the data to the execution rule. If there is no occurrence of the execution condition, the execution manager 110 approves the request to continue running the trading algorithm.

Once the execution manager 110 detects an occurrence of the execution condition defined in the execution rule, at block 508, the execution manager 110 determines if the currently executing trading algorithm complies with the rule. If, for example, any order that may be entered into by the trading algorithm is nondesirable, the execution manager 110 determines that the trading algorithm does not comply with the rule during the occurrence of the unfavorable condition. For example, the execution manager 110 determines if the continued execution of the trading algorithm would result in the entering of an order during a time which is prohibited by the execution rule.

If the continued execution of the trading algorithm does not comply with the execution rule, at block 510, the execution manager 110 limits the execution of the trading algorithm. For example, the execution manager 110 may allow the trading algorithm to close a position and/or hedge an open position, but may block the trading algorithm from entering a new position and/or increasing a position in the market during the occurrence of the execution condition.

If the continued execution of the trading algorithm complies with the execution rule, at block 512, the execution manager 110 sends an approval of the request to continue running the trading algorithm to the algorithm server 104. The approval of the continued running of the trading algorithm allows the trading algorithm to continue running and/or executing trades.

Figure 5B:
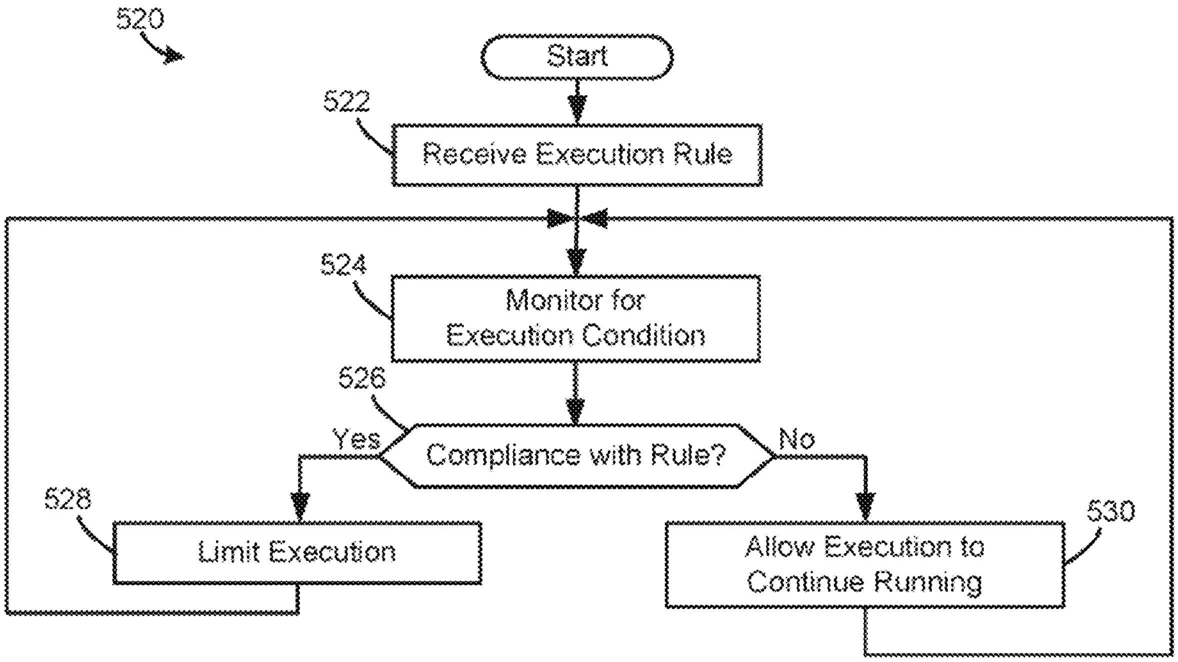

FIG. 5B illustrates a flow diagram of another example method 520 for controlling a continued running of a trading algorithm at the algorithm server 104 that is executing orders at the exchange 108. At block 522, an execution rule is received by, for example, the deployment and execution manager 110. The execution rule may be created and/or entered by a user at, for example, the trading device 102. The execution rule is used to define a favorable and/or unfavorable market execution condition in which a user may wish for a trading algorithm to be allowed to execute, blocked from executing, and/or limited in its execution.

At block 524, the execution manager 110 monitors for the execution condition defined in the execution rule. The execution manager 110 monitors for the execution condition by gathering data, for example, the market data sent by the exchange 108, processor data, and/or system data, and applying the data to the execution rule. In the example of FIG. 5B, the execution manager 110 may continuously, periodically, or aperiodically gather data to monitor for the execution condition.

Once the execution manager 110 detects an occurrence of the execution condition defined in the execution rule, at block 526, the execution manager 110 determines if the currently executing trading algorithm complies with the rule. If, for example, any order that may be entered into by the trading algorithm is nondesirable, the execution manager

110 determines that the trading algorithm does not comply with the rule during the unfavorable condition.

If the continued execution of the trading algorithm does not comply with the execution rule, at block 528, the execution manager 110 limits the execution of the trading algorithm. For example, the execution manager 110 may allow the trading algorithm to close a position and/or hedge an open position, but may block the trading algorithm from entering a new position and/or increasing a position in the market during the occurrence of the execution condition.

If the continued execution of the trading algorithm complies with the execution rule, at block 530, the execution manager 110 allows the trading algorithm to continue running and/or executing trades.

Figure 6A:
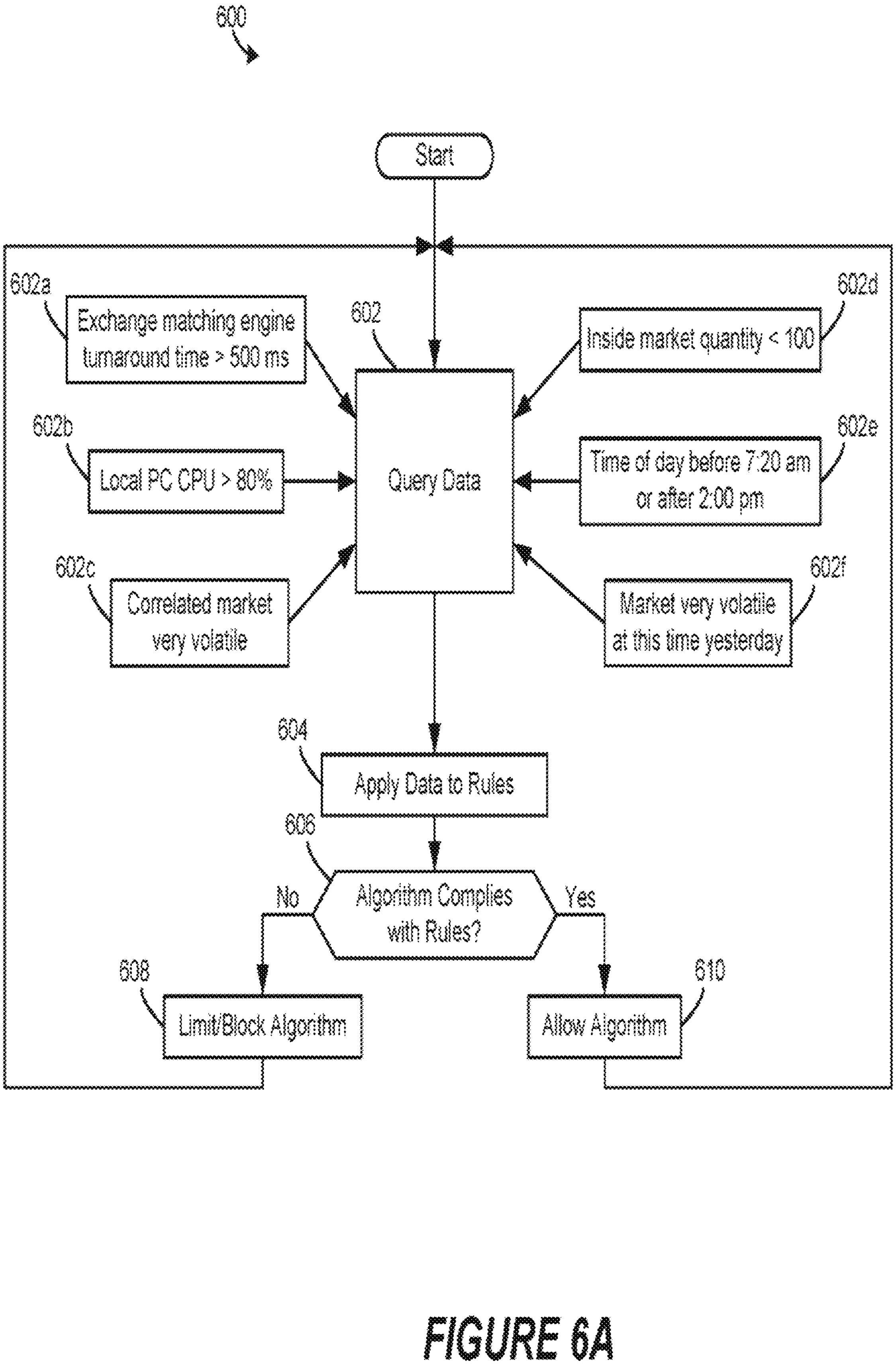
FIG. 6A illustrates a flow diagram of an example method for monitoring for an unfavorable condition.

FIG. 6A illustrates a flow diagram of an example method 600 for monitoring for an unfavorable condition. The example method 600 of FIG. 6A may be used in connection with the example methods of FIGS. 3-5 to control the deployment and/or execution of a trading algorithm. For example, the example method 600 may be used to check and/or monitor for a deployment and/or execution condition according to a deployment and/or execution rule and to determine if a trading algorithm complies with the deployment and/or execution rule during the occurrence of the unfavorable condition.

At block 602, a deployment and execution manager, for example, the deployment and execution manager 110 of FIG. 1, queries, collects and/or consumes data from a variety of sources. The sources include, for example, an exchange, such as the exchange 108 of FIG. 1, a clock, a news feed, and/or a processor. Blocks 602_a-f_ illustrate examples of types of data that the deployment and execution manager may collect. For example, block 602_a_ shows that the deployment and execution manager may collect data to determine if an exchange matching engine turnaround time is greater than 500 milliseconds. The example of block 602_b_ shows that the deployment and execution manager may collect data to determine if a local CPU is operating at a value greater than 80%. The example of block 602_c_ shows that the deployment and execution manager may collect data to determine if a correlated market (a market with similar properties and/or behaviors) is currently very volatile. The example of block 602_d_ shows that the deployment and execution manager may collect data to show and/or determine if an inside market quantity is less than 100. The example of block 602_e_ shows that the deployment and execution manager may collect data to show and/or determine if a current time of day is before 7:20 am or after 2:00 pm. The example of block 602_f_ shows that the deployment and execution manager may collect data to determine if a market very volatile at a current time during a previous day. Other examples of data that may be collected include processor usage on a server, order routing turnaround time, memory usage, news events (for example, the occurrence of a hurricane), etc.

At block 604, the deployment and execution manager applies the data collected at block 602 to the deployment and/or execution rules. For example, a rule might block a trading algorithm from deploying if an inside market quantity is less than 100. If the data collected in block 602 indicates that the inside market quantity is less than 100, the deployment and execution manager determines an unfavorable condition has occurred that may block a trading algorithm from deploying. In another example, a rule might block a trading algorithm from deploying if a current time of day is after 2:00 pm. If the data collected in block 602 indicates that the current time of day is after 2:00 pm, the deployment and execution manager determines an unfavorable condition has occurred that may block a trading algorithm from deploying.

At block 606, the deployment and execution manager determines if the trading algorithm complies with the deployment and/or execution rules during the occurrence of the unfavorable condition. If any order that may be entered into by the trading algorithm is nondesirable, the deployment and execution manager determines that the trading algorithm does not comply with the rules during the occurrence of the unfavorable condition. For example, if the deployment and execution manager determined an inside market quantity is less than 100, the deployment and execution manager determines if the trading algorithm is affected by this unfavorable condition based on the deployment rule. In some examples, the deployment rule may indicate that all trading algorithms are to be blocked from deployment during this market condition. In other examples, the deployment rule may indicate that only certain trading algorithms are to be blocked from deployment during this unfavorable condition, such as only trading algorithms used by new traders.

If the deployment and execution manager determines that the trading algorithm does not comply with the deployment and/or execution rules during the occurrence of the unfavorable condition, the deployment and execution manager limits and/or blocks the deployment and/or execution of the trading algorithm. For example, the deployment and execution manager may block the deployment and/or execution of the trading algorithm where the trading algorithm has not yet established a position in the market. In another example, the deployment and execution manager may limit the continued execution of the trading algorithm where the trading algorithm has already established a position in the market. In this example, the deployment and execution manager may allow the trading algorithm to close and/or hedge an open position in the market and may prevent the trading algorithm from entering a new position and/or adding to an open position in the market.

If the deployment and execution manager determines that the trading algorithm complies with the deployment and/or execution rules during the occurrence of the unfavorable condition, the deployment and execution manager allows the trading algorithm to deploy and/or execute.

Figure 6B:
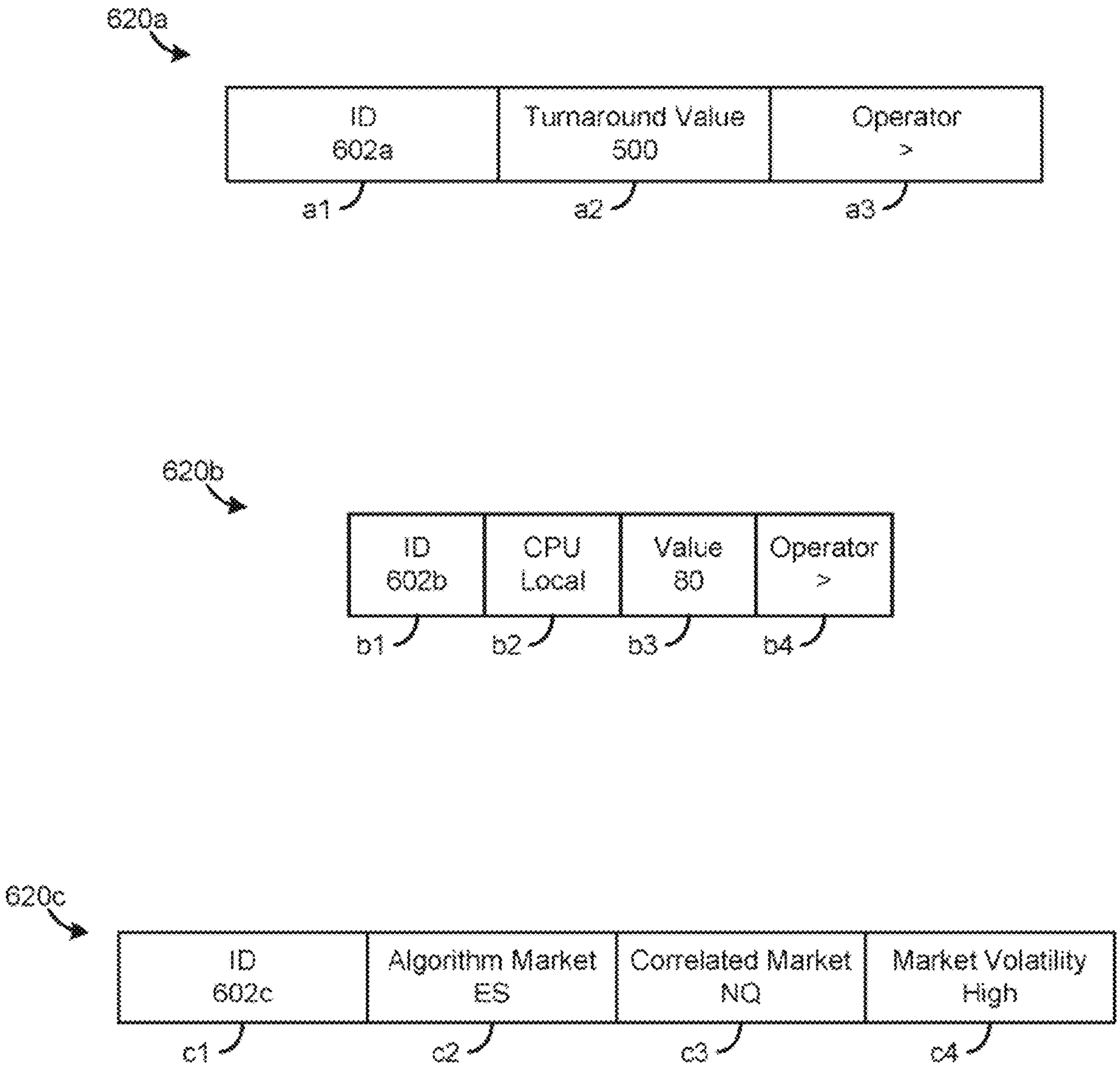
FIG. 6B illustrates example data structures for use in the example method for monitoring for an unfavorable condition of FIG. 6A.

FIG. 6B illustrates example data structures 620_a-c_ for use in the example method for monitoring for an unfavorable condition illustrated in FIG. 6A. In FIG. 6A, blocks 602_a-c_ illustrate examples of types of data that the deployment and execution manager may collect. Example data structures 620_a-c_ corresponding to blocks 602_a-c_ are shown in the illustrated example.

Block 602_a_ of FIG. 6A shows that the deployment and execution manager may collect data to determine if an exchange matching engine turnaround time is greater than, for example, 500 milliseconds. The exchange matching engine turnaround time is an amount of time it takes to receive a message indicating that a match has been made for a trade order at an exchange. The deployment and execution manager collects and/or determines the turnaround time and compares the turnaround time to the data structure 620_a_. The data structure 620_a_ includes an identification ("ID") block a1, a turnaround value block a2, and an operator block a3. The ID block a1 may include an identification of a corresponding collected data (for example, 602_a_) to identify the data that is to be compared to the data structure 620_a_. The turnaround value block a2 identifies a turnaround value that the collected data is to be compared to (for example, 500 milliseconds). The operator block a3 identifies an operator that is to be used when comparing the collected data (for example, the operator block a3 indicates that the collected value should not be greater than 500 milliseconds).

Block 602*b* of FIG. 6A shows that the deployment and execution manager may collect data to determine if a local CPU is operating at a value greater than 80%. The deployment and execution manager collects local CPU usage and compares it to the data structure 620*b*. The data structure 620*b* includes an ID block b1, a CPU block b2, a value block b3, and an operator block b4. The ID block b1 may include an identification of a corresponding collected data (for example, 602*b*) to identify the data that is to be compared to the data structure 620*b*. The CPU block b2 identifies a CPU that is to be compared (for example, the local CPU). The value block b3 identifies a usage value to which the collected data is to be compared (for example, 80%). The operator block b4 identifies an operator that is to be used when comparing the collected data (for example, the operator block b4 indicates that the collected value should not be greater than 80%).

Block 602*c* of FIG. 6A shows that the deployment and execution manager may collect data to determine if a correlated market is currently very volatile. The deployment and execution manager collects volatility data of a corresponding market and compares it to the data structure 620*c*. The data structure 620*c* includes an ID block c1, an algorithm market block c2, a correlated market block c3, and a market volatility block c4. The ID block c1 may include an identification of a corresponding collected data (for example, 602*c*) to identify the data that is to be compared to the data structure 620*c*. The algorithm market block c2 identifies a market associated with the trading algorithm that is to deploy and/or execute (for example, the ES futures market). The correlated market block c3 identifies a correlated market (for example, the NQ futures market). The market volatility block c4 identifies an amount of volatility that is to be used when comparing the collected data (for example, market volatility block c4 indicates that the correlated market volatility should not be high).

In other examples, the example data structures 620*a-c* may include additional ID blocks to identify specific trading algorithms which must be checked by the deployment and execution manager.

Figure 7A:
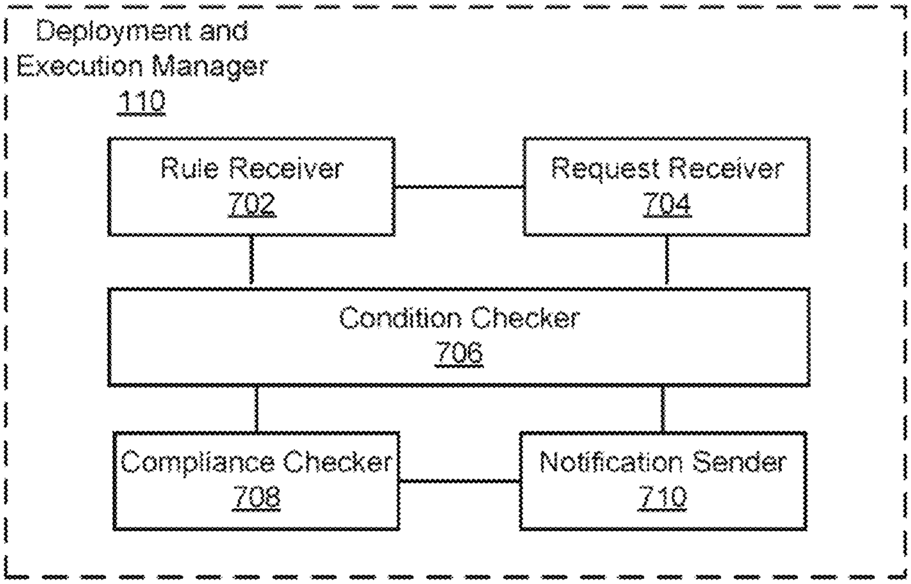
FIGS. 7A and 7B are block diagrams of example implementations of the deployment and execution manager of FIG. 1.

FIG. 7A is a block diagram of an example deployment and execution manager, such as the deployment and execution manager 110 of FIG. 1. The deployment and execution manager 110 illustrated in FIG. 7A may be used to implement the example methods described in FIGS. 3A, 4A, 5A, 6A, and 6B, for example. In certain embodiments, the deployment and execution manager 110 includes a rule receiver 702, a request receiver 704, a condition checker 706, a compliance checker 708, and a notification sender 710.

The rule receiver 702 is used by the deployment and execution manager 110 to receive deployment and/or execution rules. The deployment and/or execution rules may be created and/or input by a user at a trading device (for example, the trading device 102 of FIG. 1) and sent to the rule receiver 702. In another example, the deployment and/or execution rules may be created and/or input by a user at the rule receiver 702 via a user interface. The deployment and/or execution rules define favorable and/or unfavorable conditions that are used by the deployment and execution manager 110 to control the deployment and/or execution of a trading algorithm.

The request receiver 704 is used by the deployment and execution manager 110 to receive deployment and/or execution requests. For example, the request receiver 704 may receive a deployment request from a trading device, such as the trading device 102 of FIG. 1, to request that a trading algorithm be permitted to deploy to an algorithm server, for example, the algorithm server 104 of FIG. 1. In another example, the request receiver 704 may receive an execution request from the algorithm server to request permission to execute a trading algorithm at the algorithm server. In another example, the request receiver 704 may receive a request to continue running a trading algorithm that is executing orders at an exchange.

The condition checker 706 is used by the deployment and execution manager 110 to check for a favorable and/or unfavorable deployment and/or execution condition. For example, the deployment and/or execution rules received by the rule receiver 702 define a favorable and/or unfavorable condition and the condition checker 706 checks for the defined condition upon receiving a deployment and/or execution request at the request receiver 704. The condition checker 706 checks for the defined condition by collecting market data, processor data, and/or system data and applying the data to the deployment and/or execution rules.

Once the condition checker 706 determines the favorable and/or unfavorable deployment and/or execution condition exists, the compliance checker 708 determines if the trading algorithm complies with the deployment and/or execution rules during the occurrence of the favorable and/or unfavorable condition. If, for example, any order that may be entered into by the trading algorithm is nondesirable, the compliance checker 708 may determine that the trading algorithm does not comply with the rule during the occurrence of the unfavorable condition. For example, the compliance checker 708 determines if the deployment of the trading algorithm violates the deployment rule, if the execution of the trading algorithm violates the execution rule, and/or if the continued running of the trading algorithm violates the execution rule.

Once the compliance checker 708 determines if the trading algorithm complies with the deployment and/or execution rules, the notification sender 710 sends a denial or an approval of the deployment and/or execution request. For example, if the compliance checker 708 determines that the trading algorithm complies with the deployment and/or execution rules, the notification sender 710 sends a deployment and/or execution request approval that allows the trading algorithm to deploy, execute, and/or continue running. If the compliance checker 708 determines that the trading algorithm does not comply with the deployment and/or execution rules, the notification sender 710 sends a deployment and/or execution request denial that limits and/or blocks the trading algorithm from deploying, executing, and/or running. The notification sender 710 may set a flag that blocks the deployment and/or execution of a trading algorithm or may limit the continued execution of the trading algorithm. For example, the trading algorithm may be prevented from adding to an open position or entering a new position, but may be allowed to close a position and/or hedge a position in the market.

Figure 7B:
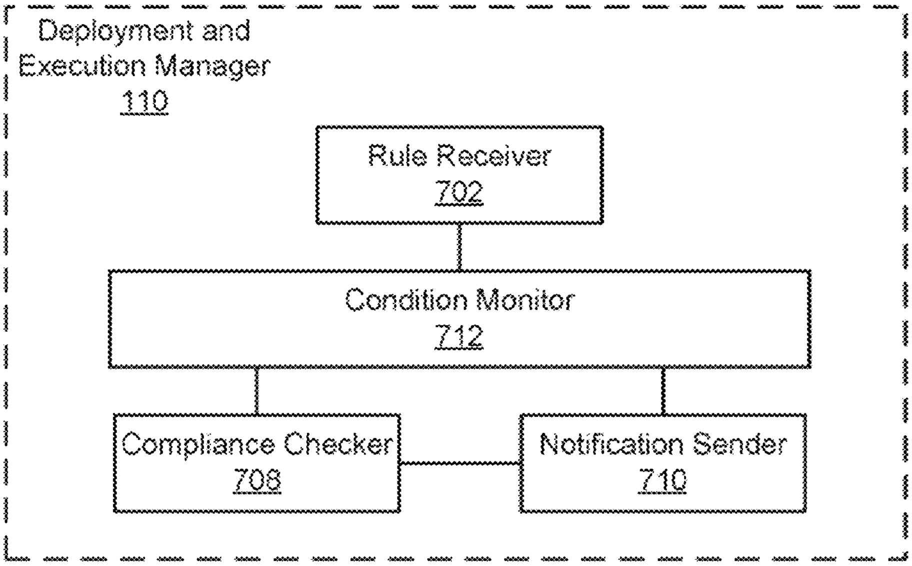

FIG. 7B is a block diagram of another example deployment and execution manager, such as the deployment and execution manager 110 of FIG. 1. The deployment and execution manager 110 illustrated in FIG. 7B may be used to implement the example methods described in FIGS. 3B, 4B, 5B, 6A, and 6B. In certain embodiments, the deployment and execution manager 110 includes the rule receiver 702, a condition monitor 712, the compliance checker 708, and the notification sender 710.

The rule receiver 702 is used by the deployment and execution manager 110 to receive deployment and/or execution rules. The deployment and/or execution rules may be created and/or input by a user at a trading device, for example, the trading device 102 of FIG. 1, and sent to the rule receiver 702. In another example, the deployment and/or execution rules may be created and/or input by a user at the rule receiver 702 via a user interface. The deployment and/or execution rules define favorable and/or unfavorable conditions that are used by the deployment and execution manager 110 to control the deployment and/or execution of a trading algorithm.

The condition monitor 712 is used by the deployment and execution manager 110 to monitor for a favorable and/or unfavorable deployment and/or execution condition. For example, the deployment and/or execution rules received by the rule receiver 702 define a favorable and/or unfavorable condition and the condition monitor 712 monitors for the defined condition. The condition monitor 712 monitors for the defined condition by collecting market data, processor data, and/or system data and applying the data to the deployment and/or execution rules. The condition monitor 712 may, for example, continuously, periodically, or aperiodically collect data to monitor for the occurrence of the favorable and/or unfavorable condition.

Once the condition monitor 712 determines the favorable and/or unfavorable deployment and/or execution condition exists, the compliance checker 708 determines if the trading algorithm complies with the deployment and/or execution rules during the occurrence of the condition. If, for example, any order that may be entered into by the trading algorithm is nondesirable, the compliance checker 708 determines that the trading algorithm does not comply with the rule during the unfavorable condition. For example, the compliance checker 708 determines if the deployment of the trading algorithm violates the deployment rule, if the execution of the trading algorithm violates the execution rule, and/or if the continued running of the trading algorithm violates the execution rule.

Once the compliance checker 708 determines if the trading algorithm complies with the deployment and/or execution rules, the notification sender 710 denies or allows the deployment and/or execution of the trading algorithm. For example, if the compliance checker 708 determines that the trading algorithm complies with the deployment and/or execution rules, the notification sender 710 sends a notification to allow the trading algorithm to deploy, execute, and/or continue running. If the compliance checker 708 determines that the trading algorithm does not comply with the deployment and/or execution rules, the notification sender 710 sends a notification to limit and/or block the trading algorithm from deploying, executing, and/or running. The notification sender 710 may set a flag that blocks the deployment and/or execution of a trading algorithm or may limit the continued execution of the trading algorithm. For example, the trading algorithm may be prevented from adding to a position or entering a new position, but may be allowed to close a position and/or hedge a position in the market.

FIGS. 8-10 illustrate example timing diagrams for controlling a deployment and/or execution of a trading algorithm. In FIGS. 8-10, the exchange 108, the algorithm server 104, the trading device 102, and the deployment and execution manager 110 are illustrated as vertical lines. For clarity and case of description, the gateway 106 is not shown. However, it should be understood that the gateway 106 may operate in conjunction with the exchange 108, the algorithm server 104, the trading device 102, and the deployment and execution manager 110.

In the illustrated examples, each of the exchange 108, the algorithm server 104, the trading device 102, and the deployment and execution manager 110 may execute one or more processes. In FIGS. 8-10, processes are shown as blocks aligned along the respective device that executes the respective processes in that particular example. An arrow depicts information conveyed from one device to another device. The order of the disclosed information flow and/or logical processes may be changed, and/or some of the disclosed information flow and/or logical processes may be changed, eliminated, sub-divided, or combined.

Figure 8A:
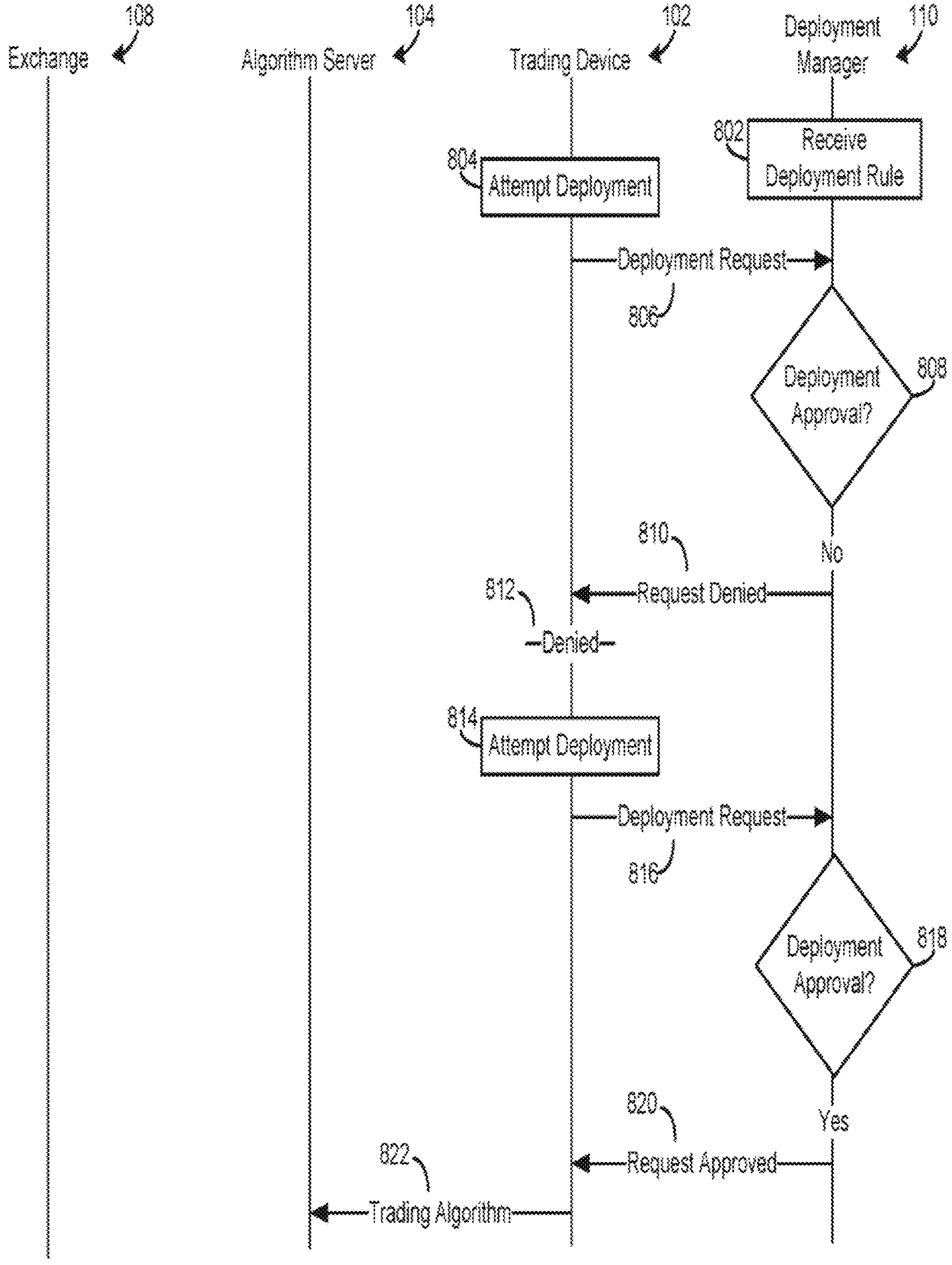
FIGS. 8A and 8B illustrate example timing diagrams for controlling a deployment of a trading algorithm.

FIG. 8A illustrates an example timing diagram for controlling a deployment of a trading algorithm. During normal operation, a trading algorithm is deployed by a trading device to an algorithm server to begin, for example, sending orders according to the trading algorithm. To control the deployment of the trading algorithm to avoid, for example, entering orders in an unfavorable market, certain embodiments provide for the creation of deployment rules. A deployment rule may be created and/or input by a user on the trading device 102 and/or the deployment manager 110. The deployment rule defines a favorable and/or unfavorable condition in which a trading algorithm may be allowed to deploy and/or blocked from deployment if the trading algorithm does not comply with the deployment rule during the favorable and/or unfavorable condition. The deployment rule may be specified by a definition which includes logic expressions and/or parameters that describe the favorable and/or unfavorable condition. For example, the unfavorable condition may be based on poor market liquidity and/or high market volatility. At block 802, the deployment manager 110 receives the deployment rule.

At block 804, the trading device 102 attempts to deploy the trading algorithm. In the example of FIG. 8A, as part of the deployment attempt, the trading device 102 sends a request to deploy the trading algorithm to the deployment manager 110 (line 806). In the example of FIG. 8A, the trading device 102 may need approval from the deployment manager 110 to deploy the trading algorithm to the algorithm server 104.

At block 808, the deployment manager 110 determines whether to approve the deployment of the trading algorithm to the algorithm server 104. To determine whether to approve the deployment, the deployment manager 110 checks for the favorable and/or unfavorable condition defined by the deployment rule and determines if the trading algorithm complies with the deployment rule during the favorable and/or unfavorable condition. To check for the favorable and/or unfavorable condition defined by the deployment rule, the deployment manager 110 collects data and applies the data to the deployment rule. The deployment manager 110 then determines if the trading algorithm complies with the deployment rule during the favorable and/or unfavorable condition. For example, if any order that may be entered into by the trading algorithm is nondesirable, the deployment manager 110 may determine that the trading algorithm does not comply with the rule during the occurrence of the unfavorable condition.

In the example of FIG. 8A, at block 808, the deployment manager 110 determines that the trading algorithm does not comply with the deployment rule during the favorable and/or unfavorable condition. Thus, the deployment manager 110 sends a denial of the deployment request to the trading device 102 (line 810). The denial of the deployment request, may, for example, set a flag that indicates that the deployment of the trading algorithm should not be processed. At line 812, the attempted deployment of the trading algorithm is denied at the trading device 102 and the trading device 102 may not deploy the trading algorithm.

At block 814, the trading device 102 again attempts to deploy the trading algorithm. Again, as part of the deployment attempt in the example of FIG. 8A, the trading device 102 sends a request to deploy the trading algorithm to the deployment manager 110 (line 816). At block 818, the deployment manager 110 determines whether to approve the deployment of the trading algorithm to the algorithm server 104. At block 818, the deployment manager 110 determines that the trading algorithm complies with the deployment rule during the favorable and/or unfavorable condition and approves the deployment of the trading algorithm. The deployment manager 110 sends an approval of the deployment request to the trading device 102 (line 820). Once the trading device 102 receives approval, the trading device 102 deploys the trading algorithm to the algorithm server 104 (line 822).

Figure 8B:
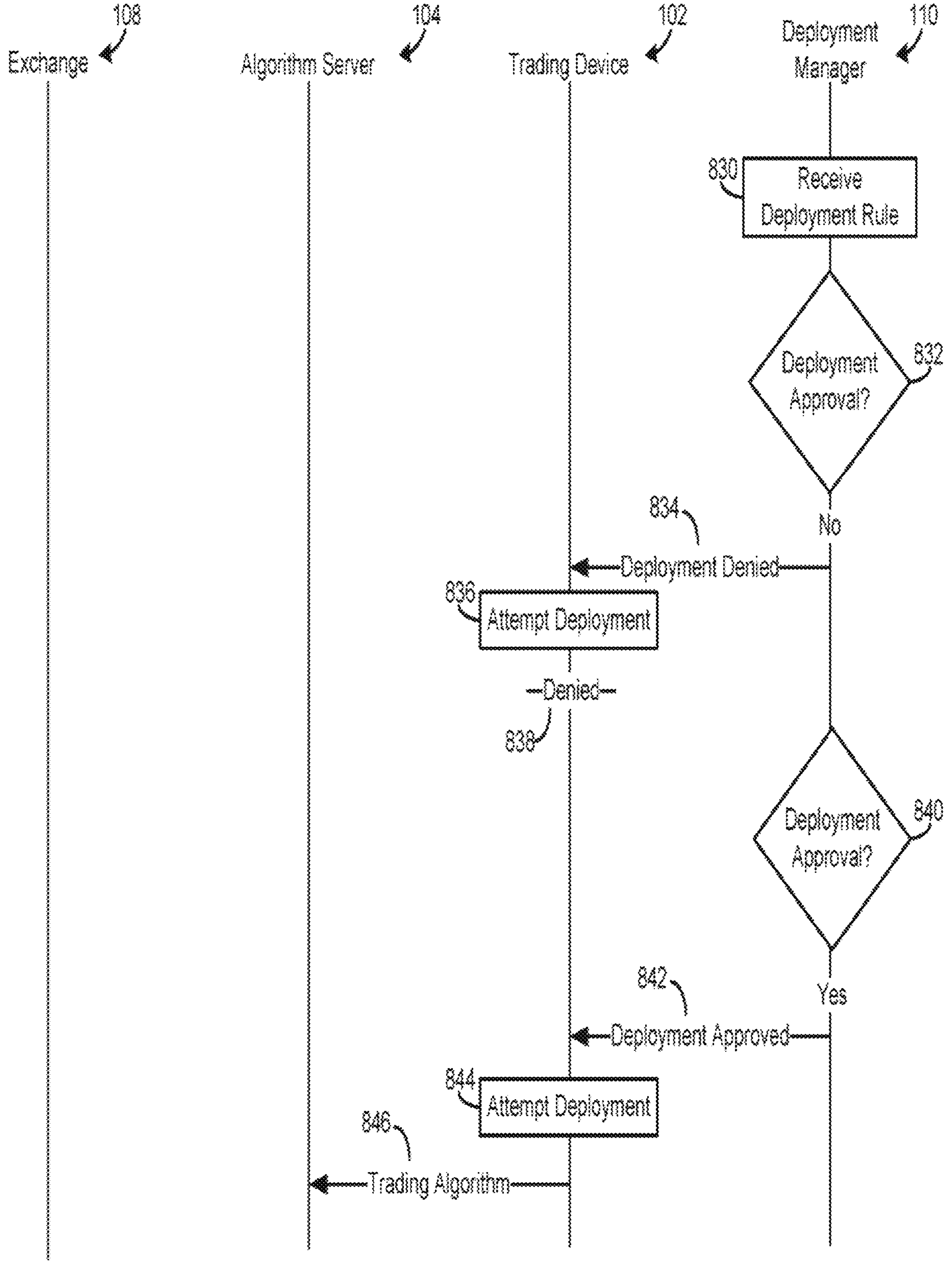

FIG. 8B illustrates another example timing diagram for controlling a deployment of a trading algorithm. In the example of FIG. 8B, the trading device 102 does not send a request to deploy the trading algorithm. At block 830, the deployment manager 110 receives a deployment rule that defines a favorable and/or unfavorable condition during which the trading algorithm may be allowed to deploy and/or blocked from deployment.

At block 832, the deployment manager 110 determines whether to allow the deployment of the trading algorithm to the algorithm server 104. To determine whether to allow the deployment, the deployment manager 110 monitors for the favorable and/or unfavorable condition defined by the deployment rule and determines if the trading algorithm complies with the deployment rule during the occurrence of the favorable and/or unfavorable condition. To monitor for the favorable and/or unfavorable condition defined by the deployment rule, the deployment manager 110 collects data and applies the data to the deployment rule. The deployment manager 110 may continuously, periodically, or aperiodically collect data to monitor for the favorable and/or unfavorable condition. The deployment manager 110 then determines if the trading algorithm complies with the deployment rule during the occurrence of the favorable and/or unfavorable condition. For example, if any order that may be entered into by the trading algorithm is nondesirable, the deployment manager 110 determines that the trading algorithm does not comply with the rule during the unfavorable condition.

In the example of FIG. 8B, at block 832, the deployment manager 110 determines that the trading algorithm does not comply with the deployment rule during the favorable and/or unfavorable condition. Thus, the deployment manager 110 denies the deployment of the trading algorithm at the trading device 102 (line 834). The denial may, for example, set a flag that indicates that the deployment of the trading algorithm should not be processed. At block 836, the trading device 102 attempts to deploy the trading algorithm. At line 838, the deployment attempt is denied at the trading device 102 and the trading device 102 may not deploy the trading algorithm to the algorithm server 104.

At block 840, the deployment manager 110 again determines whether to approve the deployment of the trading algorithm to the algorithm server 104. At block 840, the deployment manager 110 determines that the trading algorithm complies with the deployment rule during the occurrence of the favorable and/or unfavorable condition and approves the deployment of the trading algorithm. The deployment manager 110 sends an approval of the deployment the trading device 102 (line 842). At block 844, the trading device 102 again attempts to deploy the trading algorithm. Because the deployment manager 110 sent approval, the trading device 102 is not blocked from deploying the trading algorithm to the algorithm server 104 (line 846).

Figure 9A:
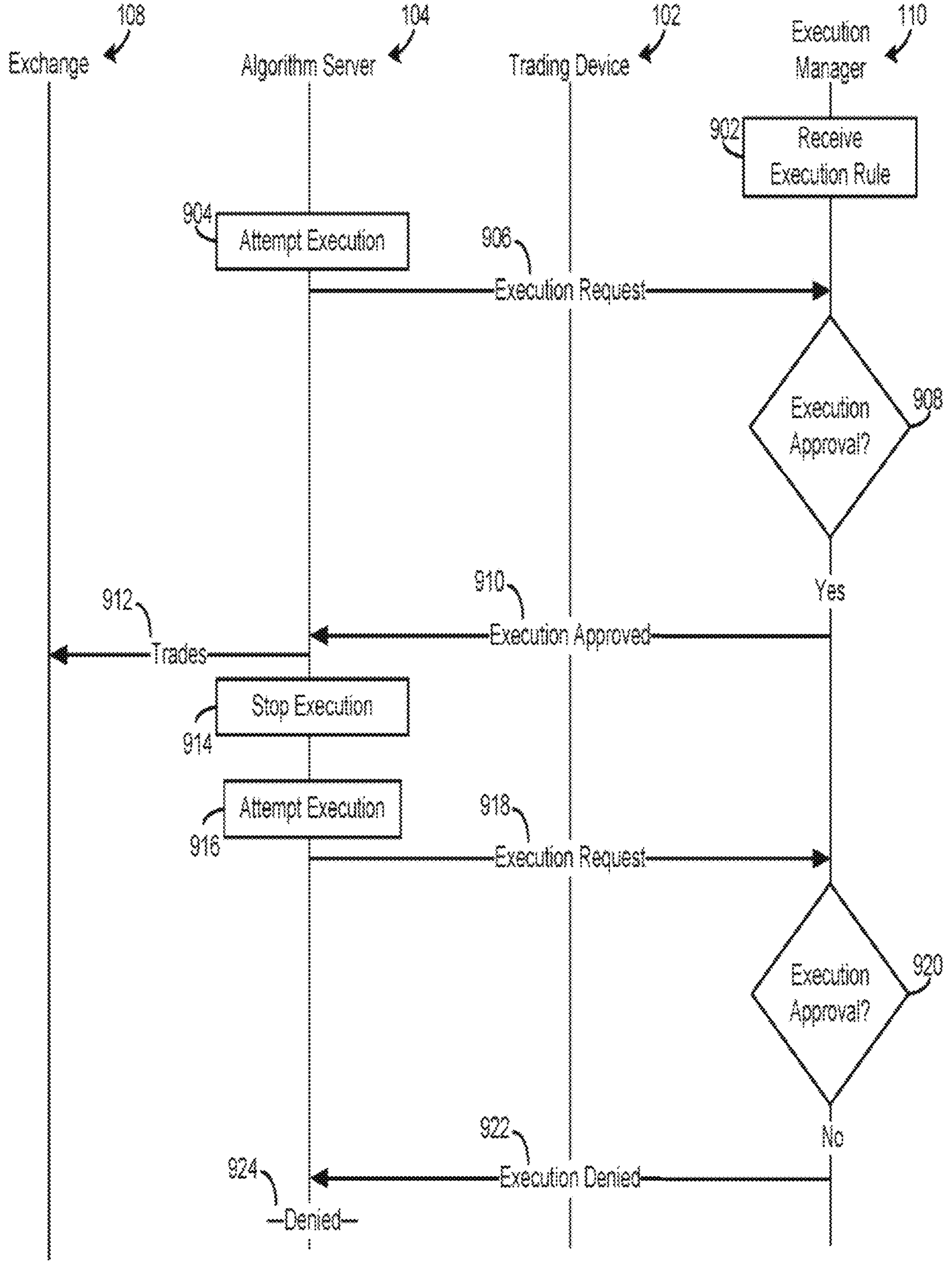
FIGS. 9A and 9B illustrate example timing diagrams for controlling an execution of a trading algorithm.

FIG. 9A illustrates an example timing diagram for controlling an execution of a trading algorithm. During normal operation, the algorithm server 104 executes a trading algorithm to begin, for example, sending orders to the exchange 108 according to the trading algorithm. To control the execution of the trading algorithm to avoid, for example, entering orders in an unfavorable market, certain embodiments provide for the creation of execution rules. An execution rule may be created and/or input by a user on the trading device 102 and/or the execution manager 110. The execution rule defines a favorable and/or unfavorable condition in which a trading algorithm may be blocked from executing if the trading algorithm does not comply with the execution rule during the occurrence of the favorable and/or unfavorable condition. The execution rule may be specified by a definition which includes logic expressions and/or parameters that describe the condition. For example, the unfavorable condition may be based on poor market liquidity and/or high market volatility. At block 902, the execution manager 110 receives the execution rule.

At block 904, the algorithm server 104 attempts to execute the trading algorithm. In the example of FIG. 9A, as part of the execution attempt, the algorithm server 104 sends a request to execute the trading algorithm to the execution manager 110 (line 906). In the example of FIG. 9A, the algorithm server 104 may need approval from the execution manager 110 to execute the trading algorithm.

At block 908, the execution manager 110 determines whether to approve the execution of the trading algorithm at the algorithm server 104. To determine whether to approve the execution, the execution manager 110 checks for the favorable and/or unfavorable condition defined by the execution rule and determines if the trading algorithm complies with the execution rule during the occurrence of the favorable and/or unfavorable condition. To check for the favorable and/or unfavorable condition defined by the execution rule, the execution manager 110 collects data and applies the data to the execution rule. The execution manager 110 then determines if the trading algorithm complies with the execution rule during the occurrence of the favorable and/or unfavorable condition. For example, if any order that may be entered into by the trading algorithm is nondesirable, the execution manager 110 determines that the trading algorithm does not comply with the rule during the occurrence of the unfavorable condition.

In the example of FIG. 9A, at block 908, the execution manager 110 determines that the trading algorithm complies with the execution rule during the occurrence of the favorable and/or unfavorable condition and approves the execution of the trading algorithm. The execution manager 110 sends an approval of the execution request to the algorithm server 104 (line 910). Once the algorithm server 104 receives approval, the algorithm server 104 executes the trading algorithm and sends trades according to the trading algorithm to the exchange 108 (line 912). In the example of FIG. 9A, the algorithm server 104 sends trades to the exchange according to the trading algorithm until the trading algorithm has completed its execution and/or terminated, at which point, the execution stops (block 914).

At block 916, the algorithm server 104 again attempts to execute the trading algorithm. Again, as part of the execution attempt in the example of FIG. 9A, the algorithm server 104 sends a request to execute the trading algorithm to the execution manager 110 (line 918). At block 920, the execution manager 110 determines whether to approve the execution of the trading algorithm at the algorithm server 104.

At block 920, the execution manager 110 determines that the trading algorithm does not comply with the execution rule during the occurrence of the favorable and/or unfavorable condition. Thus, the execution manager 110 sends a denial of the execution request to the algorithm server 104 (line 922). The denial of the execution request, may, for example, set a flag that indicates that the execution of the trading algorithm should not be processed. At line 924, the attempted execution of the trading algorithm is denied at the algorithm server 104 and the algorithm server 104 may not execute the trading algorithm.

Figure 9B:
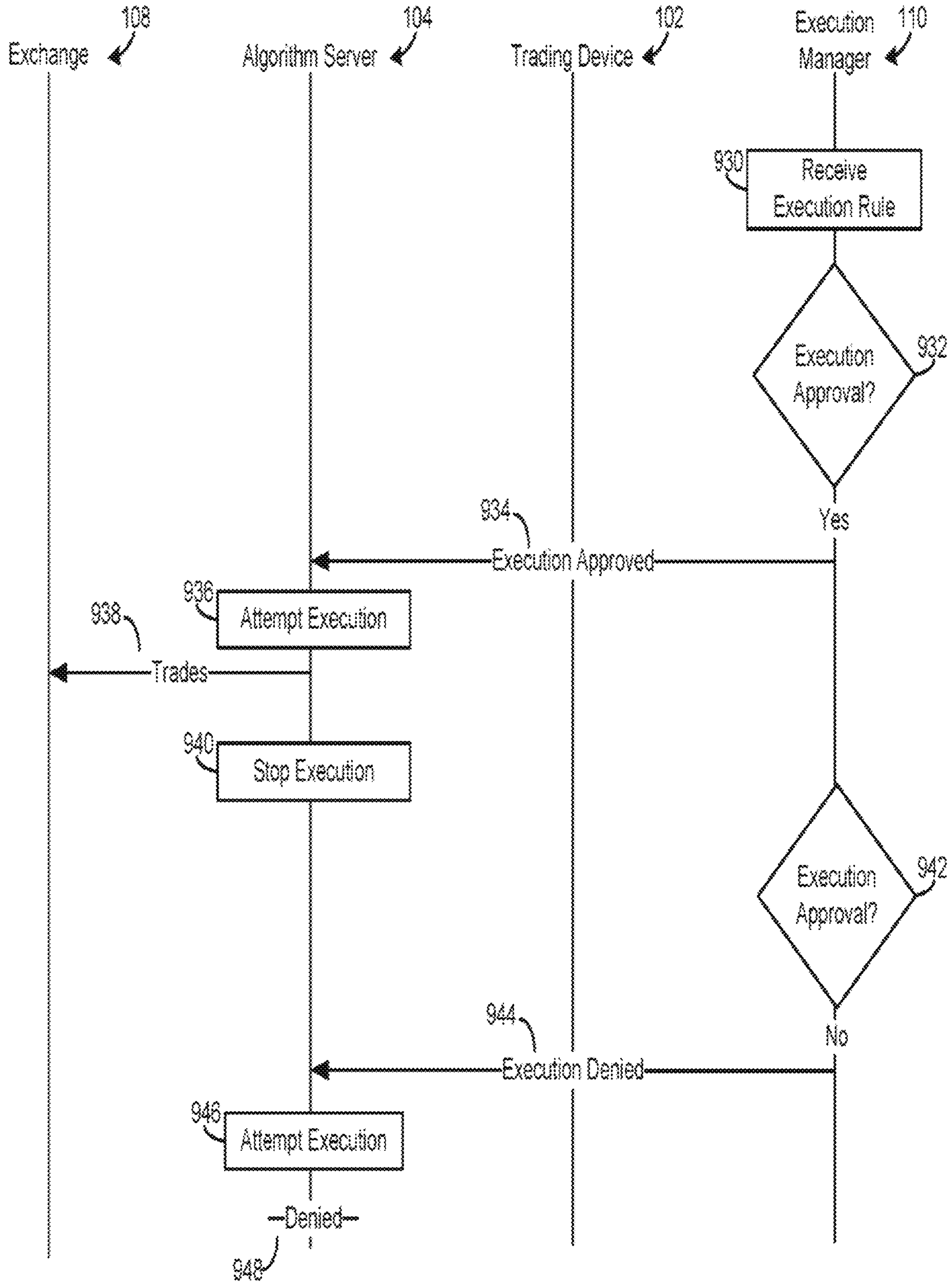

FIG. 9B illustrates another example timing diagram for controlling an execution of a trading algorithm. In the example of FIG. 9B, the algorithm server 104 does not send a request to execute the trading algorithm. At block 930, the execution manager 110 receives an execution rule that defines a favorable and/or unfavorable condition during which the trading algorithm may be blocked from execution.

At block 932, the execution manager 110 determines whether to approve the execution of the trading algorithm at the algorithm server 104. For example, if any order that may be entered into by the trading algorithm is nondesirable, the execution manager 110 determines that the trading algorithm does not comply with the rule during the occurrence of the unfavorable condition. In the example of FIG. 9B, at block 932, the execution manager 110 determines that the trading algorithm complies with the execution rule during the occurrence of the favorable and/or unfavorable condition and approves the execution of the trading algorithm. The execution manager 110 sends an approval of the execution to the algorithm server 104 (line 934).

At block 936, the algorithm server 104 attempts to execute the trading algorithm. Because the algorithm server 104 received approval from the execution manager 110, the algorithm server 104 is able to execute the trading algorithm and sends trades according to the trading algorithm to the exchange 108 (line 938). In the example of FIG. 9B, the algorithm server 104 sends trades to the exchange according to the trading algorithm until the trading algorithm has completed its execution and/or terminated, at which point, the execution stops (block 940).

At block 942, the execution manager 110 again determines whether to approve the execution of the trading algorithm at the algorithm server 104. At block 942, the execution manager 110 determines that the trading algorithm does not comply with the execution rule during the occurrence of the favorable and/or unfavorable condition. Thus, the execution manager 110 denies the execution at the algorithm server 104 (line 944). The execution denial, may, for example, set a flag that indicates that the execution of the trading algorithm should not be processed. At block 946, the algorithm server 104 again attempts to execute the trading algorithm. At line 948, the attempted execution of the trading algorithm is denied at the algorithm server 104 and the algorithm server 104 may not execute the trading algorithm.

Figure 10A:
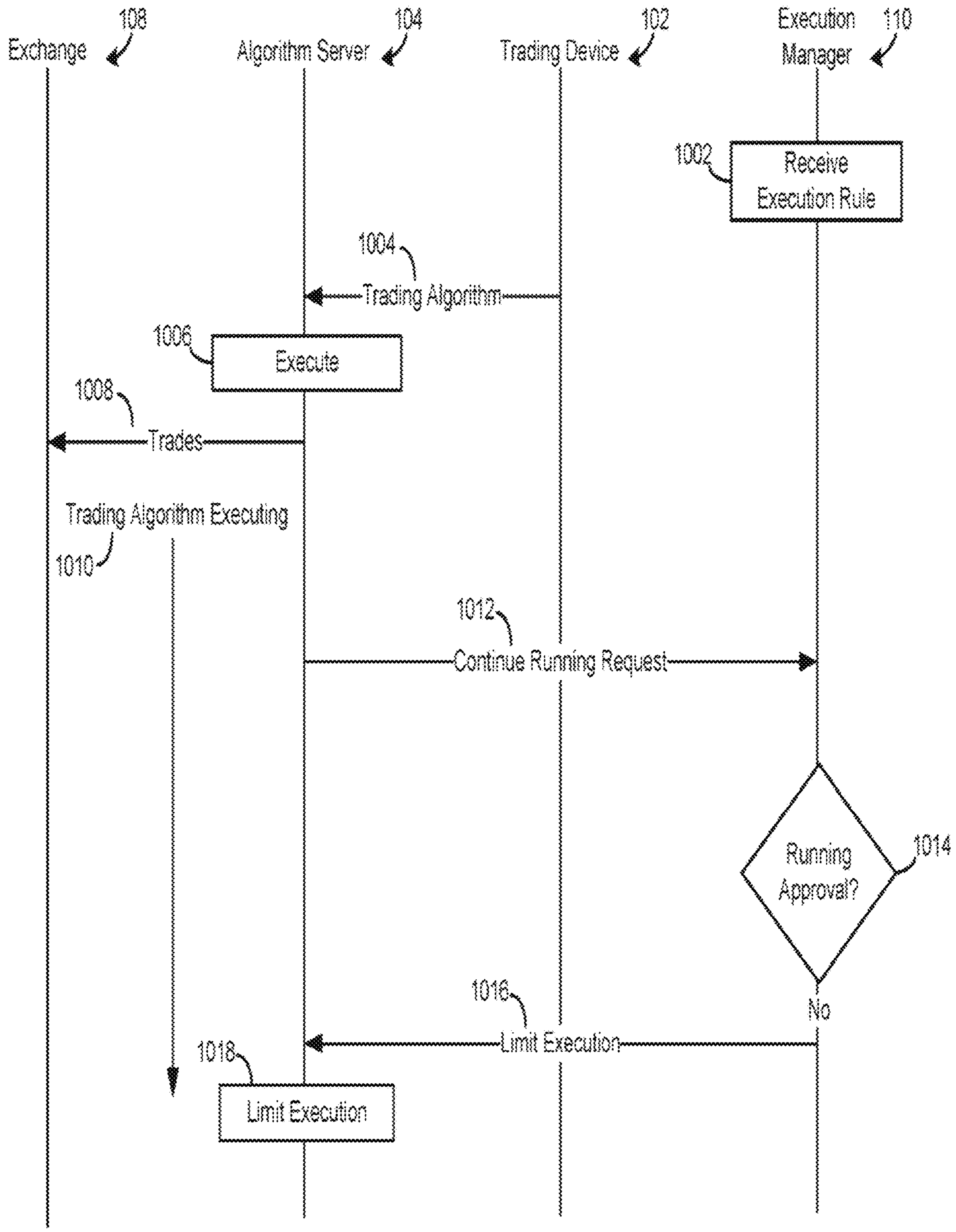
FIGS. 10A and 10B illustrate example timing diagrams for controlling a running of a trading algorithm.

FIG. 10A illustrates an example timing diagram for controlling a continued running of a trading algorithm. During normal operation, the algorithm server 104 executes a trading algorithm to begin, for example, sending orders to the exchange 108 according to the trading algorithm. To control the continued execution of the trading algorithm to avoid, for example, entering additional orders in an unfavorable market, certain embodiments provide for the creation of execution rules. An execution rule may be created and/or input by a user on the trading device 102 and/or the execution manager 110. The execution rule defines a favorable and/or unfavorable condition in which a trading algorithm may be allowed to continue executing and/or limited in its continued execution if the trading algorithm does not comply with the execution rule during the occurrence of the favorable and/or unfavorable condition. The execution rule may be specified by a definition which includes logic expressions and/or parameters that describe the favorable and/or unfavorable condition. For example, the unfavorable condition may be based on poor market liquidity and/or high market volatility. At block 1002, the execution manager 110 receives the execution rule.

At line 1004, the trading algorithm is sent from the trading device 102 to the algorithm server 104 to be executed. At block 1006, the algorithm server 104 executes the trading algorithm and begins sending trades to the exchange 108 according to the trading algorithm (line 1008). While the trading algorithm is executing (line 1010) and trades are being sent to the exchange 108 according to the trading algorithm, the algorithm server 104 sends a request to the execution manager 110 to continue running the trading algorithm (line 1012). In the example of FIG. 10A, the algorithm server 104 may need approval from the execution manager 110 to continue running the trading algorithm.

At block 1014, the execution manager 110 determines whether to approve the continued running of the trading algorithm at the algorithm server 104. To determine whether to approve the continued running, the execution manager 110 checks for the favorable and/or unfavorable condition defined by the execution rule and determines if the trading algorithm is complying with the execution rule during the occurrence of the favorable and/or unfavorable condition. To check for the favorable and/or unfavorable condition defined by the execution rule, the execution manager 110 collects data and applies the data to the execution rule. The execution manager 110 then determines if the trading algorithm is complying with the execution rule during the occurrence of the favorable and/or unfavorable condition. For example, if any order that may be entered into by the trading algorithm is nondesirable, the execution manager 110 determines that the trading algorithm does not comply with the rule during the occurrence of the unfavorable condition.

At block 1014, the execution manager 110 determines that the trading algorithm is not complying with the execution rule during the occurrence of the favorable and/or unfavorable condition. Thus, the execution manager 110 responds to the request to continue running by limiting the continued execution of the trading algorithm (line 1016). At box 1018, the continued execution of the trading algorithm is limited at the algorithm server 104. Limiting the continued execution of the trading algorithm may include, for example, preventing the trading algorithm from entering a new position and/or preventing the trading algorithm from adding to a position in the market. Limiting the continued execution of the trading algorithm may include, for example, allowing the trading algorithm to close a position and/or allowing the trading algorithm to hedge a position in the market.

Figure 10B:
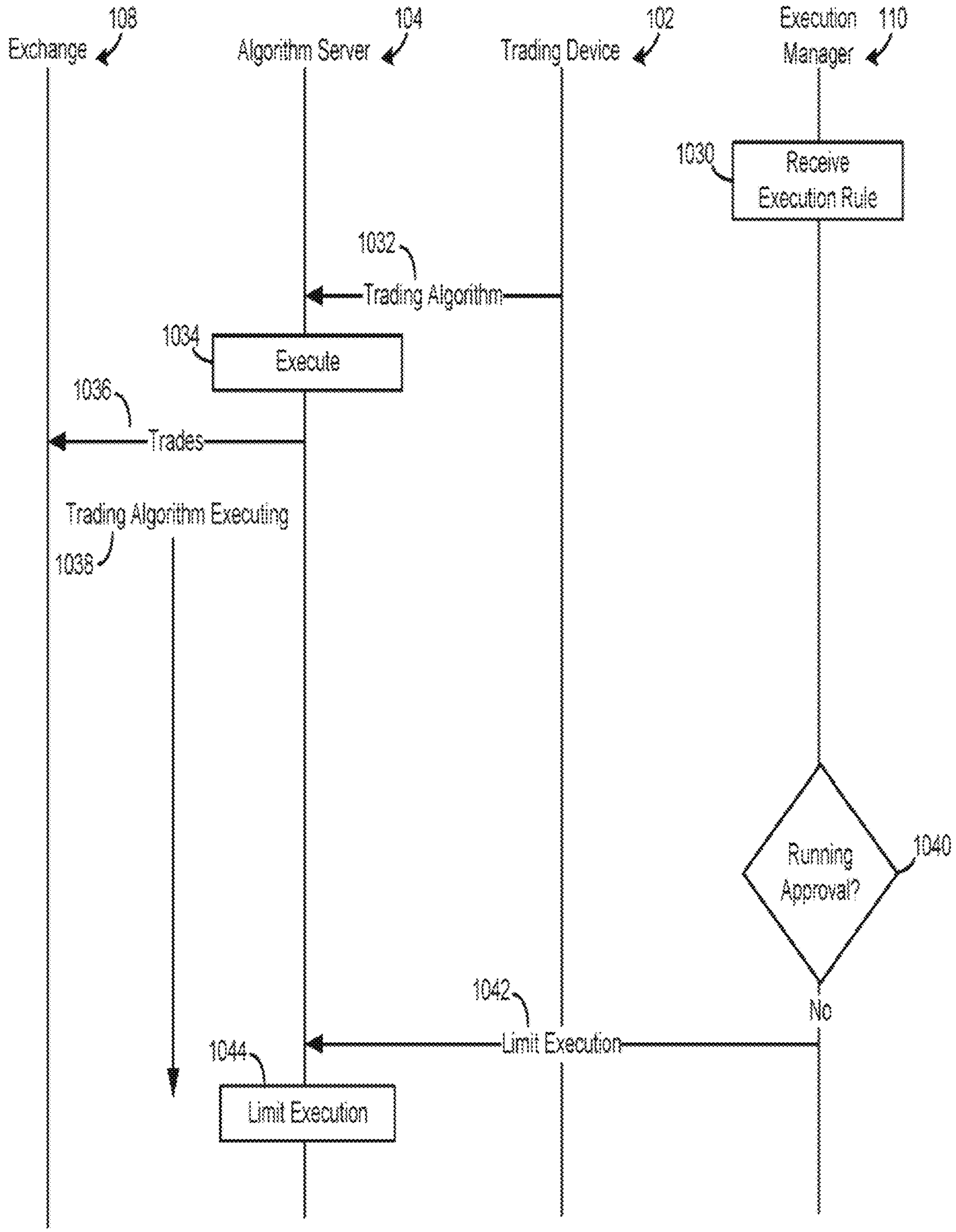

FIG. 10B illustrates another example timing diagram for controlling a continued running of a trading algorithm. In the example of FIG. 10B, the algorithm server 104 does not send a request to continue running the trading algorithm. At block 1030, the execution manager 110 receives an execution rule that defines a favorable and/or unfavorable condition during which the trading algorithm may be allowed to continue executing and/or limited in its continued execution.

At line 1032, the trading algorithm is sent from the trading device 102 to the algorithm server 104 to be executed. At block 1034, the algorithm server 104 executes the trading algorithm and begins sending trades to the exchange 108 according to the trading algorithm (line 1036). While the trading algorithm is executing (line 1038) and trades are being sent to the exchange 108 according to the trading algorithm, the execution manager 110 determines whether to allow the continued running of the trading algorithm at the algorithm server 104 (block 1040). For example, if any order that may be entered into by the trading algorithm is nondesirable, the execution manager 110 determines that the trading algorithm does not comply with the rule during the occurrence of the unfavorable condition.

At block 1040, the execution manager 110 determines that the trading algorithm is not complying with the execution rule during the occurrence of the favorable and/or unfavorable condition. Thus, the execution manager 110 limits the continued execution of the trading algorithm (line 1042). At box 1044, the continued execution of the trading algorithm is limited at the algorithm server 104. Limiting the continued execution of the trading algorithm may include, for example, preventing the trading algorithm from entering a new position and/or preventing the trading algorithm from adding to a position in the market. Limiting the continued execution of the trading algorithm may include, for example, allowing the trading algorithm to close a position and/or allowing the trading algorithm to hedge a position in the market.

Some of the described figures depict example block diagrams, systems and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, or any combination thereof, for example.

The example block diagrams, systems, and/or flow diagrams may be implemented using any combination(s) of application specific integrated circuit(s) ("ASIC" (s)), programmable logic device(s) ("PLD" (s)), field programmable logic device(s) ("FPLD" (s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory ("RAM"), read-only memory ("ROM"), programmable read-only memory ("PROM"), electrically programmable read-only memory ("EPROM"), electrically erasable read-only memory ("EEPROM"), flash memory, a hard disk drive, optical media, magnetic tape, a file server, any other tangible data storage device, or any combination thereof. The tangible computer readable medium is non-transitory. As used herein, the term non-transitory or tangible computer readable medium is expressly defined to include any type of computer readable storage media and to exclude propagating signals.

Further, although the example block diagrams, systems, and/or flow diagrams are described above with reference to the figures, other implementations may be employed. For example, the order of execution of the components, elements, blocks and/or other functionality may be changed, and/or some of the components, elements, blocks and/or other functionality described may be changed, eliminated, sub-divided, or combined. Additionally, any or all of the components, elements, blocks, and/or other functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method including:

monitoring operating condition data including CPU load of an algorithm server;

receiving a first operating condition rule, wherein the first operating condition rule specifies an execution condition applied to operating condition data, wherein the execution condition is based on CPU load associated with the algorithm server;

receiving an initiate execution command for a trading algorithm, wherein the trading algorithm is configured to send trading actions to an electronic exchange;

detecting, in response to the monitoring, an occurrence of a first condition at a first time based on the first operating condition rule, wherein the execution condition specified in the first operating condition rule is applied to the monitored operating condition data; and sending, in response to detecting the occurrence of the first condition, a execution flag command to the algorithm server that indicates approval to execute the trading algorithm in response to receiving the initiate execution command for the trading algorithm, wherein the algorithm server executes the trading algorithm in response to receiving the execution flag command.

2. The method of claim 1, wherein the monitoring is one of continuous, periodic, and aperiodic.

3. The method of claim 1, wherein the operating condition data further includes at least one of memory usage of the algorithm server, market data, processor data, system data, data from a clock, data from a news feed, exchange matching engine turnaround time, order routing turnaround time, market liquidity, market volatility, or quantity available in a market.

4. The method of claim 1, wherein detecting the occurrence of the first condition is based on a trade action the trading algorithm is configured to send.

5. The method of claim 1, further includes:

detecting, in response to the monitoring, an occurrence of a first unfavorable condition at a second time based on a second operating condition rule, wherein the second operating condition rule specifies a second execution condition that is applied to the monitored operating condition data, wherein the second time is later than the first time; and sending, in response to detecting the occurrence of the first unfavorable condition, a second execution flag command to the algorithm server that indicates execution of the trading algorithm should be limited, wherein the algorithm server limits the execution of the trading algorithm in response to receiving the second execution flag command.

6. The method of claim 5, wherein the algorithm server limits the execution of the trading algorithm by at least one of stopping the trading algorithm, blocking the trading algorithm from adding to an open position, blocking the trading algorithm from opening a new position, permitting the trading algorithm to only close an open position, or permitting the trading algorithm to only hedge an open position.

7. The method of claim 5, wherein the second operating condition rule is the same as the first operating condition rule.

8. A tangible, non-transitory computer readable medium including instructions that, when executed, cause at least one processor to perform a set of operations including:

monitoring operating condition data including CPU load of an algorithm server;

receiving a first operating condition rule, wherein the first operating condition rule specifies an execution condition applied to operating condition data, wherein the execution condition is based on CPU load associated with the algorithm server;

receiving an initiate execution command for a trading algorithm, wherein the trading algorithm is configured to send trading actions to an electronic exchange;

detecting, in response to the monitoring, an occurrence of a first condition at a first time based on the first operating condition rule, wherein the execution condition specified in the first operating condition rule is applied to the monitored operating condition data; and sending, in response to detecting the occurrence of the first condition, a execution flag command to the algorithm server that indicates approval to execute the trading algorithm in response to receiving the initiate execution command for the trading algorithm, wherein the algorithm server executes the trading algorithm in response to receiving the execution flag command.

9. The tangible, non-transitory computer readable medium of claim 8, wherein the monitoring is one of continuous, periodic, and aperiodic.

10. The tangible, non-transitory computer readable medium of claim 8, wherein the operating condition data further includes at least one of memory usage of the algorithm server, market data, processor data, system data, data from a clock, data from a news feed, exchange matching engine turnaround time, order routing turnaround time, market liquidity, market volatility, or quantity available in a market.

11. The tangible, non-transitory computer readable medium of claim 8, wherein detecting the occurrence of the first condition is based on a trade action the trading algorithm is configured to send.

12. The tangible, non-transitory computer readable medium of claim 8, wherein the set of operations further includes:

detecting, in response to the monitoring, an occurrence of a first unfavorable condition at a second time based on a second operating condition rule, wherein the second operating condition rule specifies a second execution condition that is applied to the monitored operating condition data, wherein the second time is later than the first time; and sending, in response to detecting the occurrence of the first unfavorable condition, a second execution flag command to the algorithm server that indicates execution of the trading algorithm should be limited, wherein the algorithm server limits the execution of the trading algorithm in response to receiving the second execution flag command.

13. The tangible, non-transitory computer readable medium of claim 12, wherein the algorithm server limits the execution of the trading algorithm by at least one of stopping the trading algorithm, blocking the trading algorithm from adding to an open position, blocking the trading algorithm from opening a new position, permitting the trading algorithm to only close an open position, or permitting the trading algorithm to only hedge an open position.

14. A computing device comprising:

at least one processor; and tangible, non-transitory computer readable medium including instructions that, when executed, cause the at least one processor to perform a set of operations including:

monitoring operating condition data including CPU load of an algorithm server;

receiving a first operating condition rule, wherein the first operating condition rule specifies an execution condition applied to operating condition data, wherein the execution condition is based on CPU load associated with the algorithm server;

receiving an initiate execution command for a trading algorithm, wherein the trading algorithm is configured to send trading actions to an electronic exchange;

detecting, in response to the monitoring, an occurrence of a first condition at a first time based on the first operating condition rule, wherein the execution condition specified in the first operating condition rule is applied to the monitored operating condition data; and sending, in response to detecting the occurrence of the first condition, a execution flag command to the algorithm server that indicates approval to execute the trading algorithm in response to receiving the initiate execution command for the trading algorithm, wherein the algorithm server executes the trading algorithm in response to receiving the execution flag command.

15. The computing device of claim 14, wherein the monitoring is one of continuous, periodic, and aperiodic.

16. The computing device of claim 14, wherein the operating condition data further includes at least one of memory usage of the algorithm server, market data, processor data, system data, data from a clock, data from a news feed, exchange matching engine turnaround time, order routing turnaround time, market liquidity, market volatility, or quantity available in a market.

17. The computing device of claim 14, wherein detecting the occurrence of the first condition is based on a trade action the trading algorithm is configured to send.

18. The computing device of claim 14, wherein the set of operations further includes:

detecting, in response to the monitoring, an occurrence of a first unfavorable condition at a second time based on a second operating condition rule, wherein the second operating condition rule specifies a second execution condition that is applied to the monitored operating condition data, wherein the second time is later than the first time; and sending, in response to detecting the occurrence of the first unfavorable condition, a second execution flag command to the algorithm server that indicates execution of the trading algorithm should be limited, wherein the algorithm server limits the execution of the trading algorithm in response to receiving the second execution flag command.

19. The computing device of claim 18, wherein the algorithm server limits the execution of the trading algorithm by at least one of stopping the trading algorithm, blocking the trading algorithm from adding to an open position, blocking the trading algorithm from opening a new position, permitting the trading algorithm to only close an open position, or permitting the trading algorithm to only hedge an open position.

20. The computing device of claim 14, wherein the computing device includes the algorithm server.

* * * * *